United States Patent
Kim et al.

(10) Patent No.: US 10,146,746 B2
(45) Date of Patent: Dec. 4, 2018

(54) METHOD AND SYSTEM FOR CONVERTING A DOCUMENT

(71) Applicant: KUKUDOCS INC., Seongnam-si, Gyeonggi-do (KR)

(72) Inventors: Hyun Jun Kim, Seoul (KR); Seong Jun Jo, Incheon (KR); Seung Jik Lee, Siheung-si (KR)

(73) Assignee: KUKUDOCS INC., Seongnam-si (KR)

( * ) Notice: Subject to any disclaimer, the term of this patent is extended or adjusted under 35 U.S.C. 154(b) by 34 days.

(21) Appl. No.: 15/364,223

(22) Filed: Nov. 29, 2016

(65) Prior Publication Data
US 2018/0150434 A1 May 31, 2018

(51) Int. Cl.
G06F 17/00 (2006.01)
G06F 17/21 (2006.01)
G06F 17/22 (2006.01)

(52) U.S. Cl.
CPC .......... *G06F 17/212* (2013.01); *G06F 17/217* (2013.01); *G06F 17/22* (2013.01); *G06F 17/2264* (2013.01); *G06F 17/2294* (2013.01)

(58) Field of Classification Search
CPC .. G06F 17/2294; G06F 3/04855; G06F 3/048; G06F 17/212; G06F 17/217; G06F 17/22; G06F 17/2264
(Continued)

(56) References Cited

U.S. PATENT DOCUMENTS

2003/0122863 A1* 7/2003 Dieberger ............. G06F 3/0483
715/730
2004/0111675 A1 6/2004 Mori et al.

2005/0091591 A1* 4/2005 Boguraev ............. G06F 17/214
715/273
2006/0224952 A1 10/2006 Lin
(Continued)

FOREIGN PATENT DOCUMENTS

| KR | 10-2009-0016959 A | 2/2009 |
| KR | 10-1202849 B1 | 12/2012 |
| KR | 10-2015-0088529 A | 8/2015 |
| KR | 10-2016-0113135 A | 9/2016 |

OTHER PUBLICATIONS

Extended European Search Report dated Aug. 3, 2017 as received in Application No. 162075493.
International Search Report dated Aug. 23, 2017 as received in Application No. PCT/KR2016/015546.

*Primary Examiner* — Scott T Baderman
*Assistant Examiner* — Jason T Edwards
(74) *Attorney, Agent, or Firm* — Maschoff Brennan

(57) ABSTRACT

Provided are a method of converting a document and a system for performing the method. The method includes loading a document file about an original document generated to have a plurality of pages, extracting content information about content of the original document and layout information about a page layout of the original document, generating a content layer composed of a single sheet including content corresponding to the content of the original document, inserting an intermediate blank space into a separating position corresponding to a page boundary of the original document on the single sheet of the content layer, generating a frame layer composed of a single sheet including as many page frames, and generating a converted document composed of a single sheet in which the content layer and the frame layer overlap and visually providing a page separation substantially the same as a page separation of the original document.

25 Claims, 30 Drawing Sheets

(58) Field of Classification Search
USPC .......................................................... 715/244
See application file for complete search history.

(56) References Cited

U.S. PATENT DOCUMENTS

| | | | |
|---|---|---|---|
| 2011/0179351 A1* | 7/2011 | Capela | G06F 17/214 |
| | | | 715/244 |
| 2012/0198384 A1* | 8/2012 | Kumamoto | G06F 3/04855 |
| | | | 715/786 |
| 2013/0111368 A1* | 5/2013 | Laughlin | G06F 17/30994 |
| | | | 715/760 |
| 2014/0012685 A1 | 1/2014 | Le Chevalier et al. | |
| 2014/0075294 A1* | 3/2014 | Hadley | G06F 17/212 |
| | | | 715/243 |
| 2014/0108897 A1 | 4/2014 | Boutelle et al. | |
| 2014/0109012 A1* | 4/2014 | Choudhary | G06F 3/0483 |
| | | | 715/838 |
| 2014/0115435 A1 | 4/2014 | Elseth et al. | |
| 2014/0245126 A1* | 8/2014 | Sharma | G06F 17/2241 |
| | | | 715/234 |
| 2015/0212981 A1 | 7/2015 | Wakefield et al. | |

\* cited by examiner

METHOD AND SYSTEM FOR CONVERTING A DOCUMENT

BACKGROUND

1. Field of the Invention

The present invention relates to a method of converting an electronic document created through a word processing program into a web-compatible format and a system for performing the method.

2. Discussion of Related Art

An electronic document denotes information that is created in an electronic form through a word processing program and stored or transmitted, and can be used in the electronic form as is or in a printed form. These days, electronic documents can be frequently created through a personal computer (PC)-based word processing program and also are written through a word processing program run on a smart phone or a tablet computer.

Such electronic documents can be output on a device for showing electronic documents in various ways for a user of the electronic document to see the electronic document. Electronic documents can be output on a device through an interface provided by a word processing program or output through another application, which is not a word processing program, for only viewing documents. Also, an electronic document created through a word processing program may be converted into a web-compatible format and output on a device through a web browser.

However, when an electronic document is converted into a web-compatible format and output through an Internet-based web browser, the original document is converted into a format that is solely provided by the web browser, and output. Therefore, inconvenience exists, such as a low output speed of the electronic document, differences in visual format between the converted electronic document and the original document, and so on.

SUMMARY OF THE INVENTION

The present invention is directed to providing an electronic document conversion method for generating an electronic document in a web-compatible format at a high output speed, and a system for performing the method.

The present invention is also directed to providing an electronic document conversion method for generating an electronic document in a web-compatible format that is visually expressed in the same way as an electronic document created through a word processing program, and a system for performing the method.

Technical problems of the present invention are not limited to the aforementioned technical problems, and other technical problems that are not mentioned above may be clearly understood by those of ordinary skill in the art from the following descriptions and appended drawings.

According to an aspect of the present invention, there is provided a method of converting a document, the method including: loading a document file about an original document generated to have a plurality of pages through a word processing program on a local device; extracting content information about content of the original document and layout information about a page layout of the original document from the document file; generating a content layer composed of a single sheet including content corresponding to the content of the original document by using the content information; inserting an intermediate blank space into a separating position corresponding to a page boundary of the original document on the single sheet of the content layer based on the layout information; generating a frame layer composed of a single sheet including as many page frames as the number of pages of the original document based on the layout information; and generating a converted document composed of a single sheet in which the content layer and the frame layer overlap and visually providing a page separation substantially the same as a page separation of the original document.

According to another aspect of the present invention, there is provided an apparatus for converting a document, the apparatus including: an original document providing unit configured to load a document file about an original document generated to have a plurality of pages through a word processing program on a local device; a document converting unit configured to extract content information about content of the original document and layout information about a page layout of the original document from the document file, generate a content layer composed of a single sheet including content corresponding to the content of the original document by using the content information, generate a frame layer composed of a single sheet including as many page frames as the number of pages of the original document based on the layout information, and insert an intermediate blank space into a separating position corresponding to a page boundary of the original document on the single sheet of the content layer based on the layout information; and a converted document generator configured to generate a converted document composed of a single sheet in which the content layer and the frame layer overlap and visually providing a page separation substantially the same as a page separation of the original document.

Solutions to the problems of the present invention are not limited to the solutions described above, and other solutions that are not mentioned above may be clearly understood by those of ordinary skill in the art from the following descriptions and appended drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
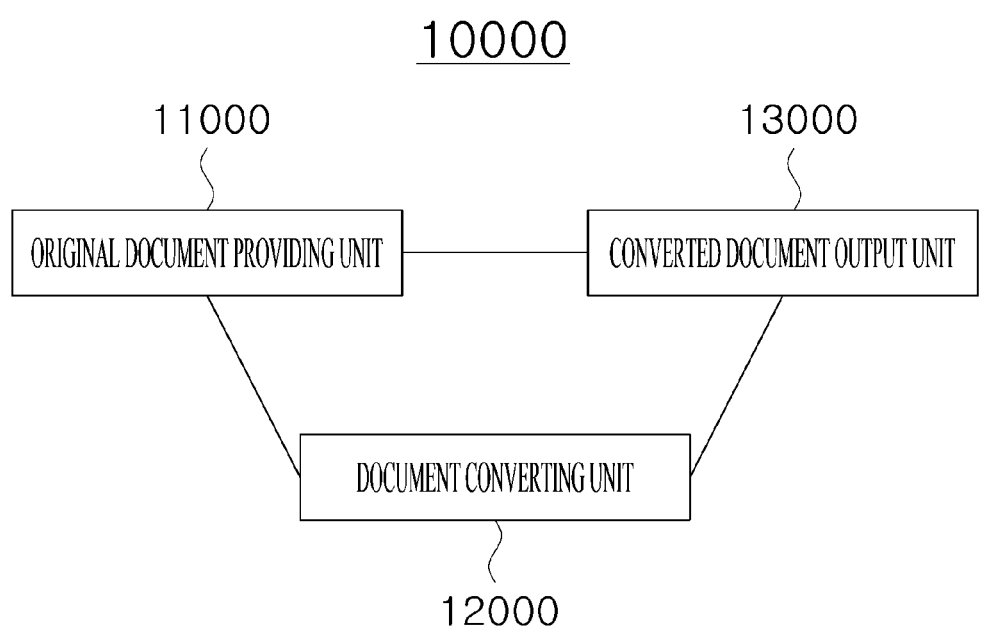
FIG. 1 is a block diagram showing elements of an electronic document converting system according to an exemplary embodiment of the present application.

Exemplary embodiments disclosed herein are intended to clearly describe the spirit of the present application to those of ordinary skill in the art to which the present application pertains. Therefore, it should be understood that the present application is not limited to the embodiments disclosed herein, and the scope of the present application includes corrected examples and modified examples not departing from the spirit of the present application.

Although terms used herein are selected from among general terms that are currently and widely used in consideration of functionality in the present application, these may be changed according to intentions or customs of those of ordinary skill in the art to which the present application pertains, the advent of a new technology, and so on. However, when a specific term is defined and used with an arbitrary meaning, the meaning of the term will be separately described. Therefore, terms used herein should be interpreted based on substantive meanings of the terms and content of this entire specification rather than simply the terms themselves.

Drawings in this specification are intended to readily describe the present application. Elements shown in the drawings may be exaggerated as necessary to help in understanding of the present application, and the present application is not limited to the drawings.

When it is determined that detailed descriptions of known configurations or functions related to the present application may obscure the gist of the present application, the detailed descriptions may be omitted as necessary in this specification.

According to an aspect of the present application, there may be provided a method of converting a document, the method including: loading a document file about an original document generated to have a plurality of pages through a word processing program on a local device; extracting content information about content of the original document and layout information about a page layout of the original document from the document file; generating a content layer composed of a single sheet including content corresponding to the content of the original document by using the content information; inserting an intermediate blank space into a separating position corresponding to a page boundary of the original document on the single sheet of the content layer based on the layout information; generating a frame layer composed of a single sheet including as many page frames as the number of pages of the original document based on the layout information; and generating a converted document composed of a single sheet in which the content layer and the frame layer overlap and visually providing a page separation substantially the same as a page separation of the original document.

The inserting of the intermediate blank space may include determining the separating position based on page size information and blank space information in the layout information.

The inserting of the intermediate blank space may include calculating a size of the intermediate blank space based on the blank space information in the layout information.

The inserting of the intermediate blank space may include calculating the size of the intermediate blank space by additionally considering a distance between the separating position and the upper end of the content when a display region of the content on the single sheet includes the separating position.

The inserting of the intermediate blank space may include calculating the size of the intermediate blank space by additionally considering a page gap of the converted document set in advance.

The inserting of the intermediate blank space may include calculating a size of the intermediate blank space by summing an upper blank space and a lower blank space of the original document according to the blank space information and the page gap.

The inserting of the intermediate blank space may include calculating the size of the intermediate blank space by additionally summing a distance between the separating position and the upper end of the content when a display region of the content on the single sheet includes the separating position.

The inserting of the intermediate blank space may include inserting the intermediate blank space between upper text above the separating position and text of the content other than the upper text when content in a text paragraph form includes the separating position.

The inserting of the intermediate blank space may include inserting, when the separating position belongs to a display region of content of a text line or the content of the text line is right below the separating position, the intermediate blank space above the text line.

The inserting of the intermediate blank space may include inserting, when the separating position belongs to a display region of content of an image or the content of the image is right below the separating position, the intermediate blank space above the image.

The inserting of the intermediate blank space may include inserting, when the separating position belongs to a display region of content of a table, the intermediate blank space into a row of the table to which the separating position belongs.

The inserting of the intermediate blank space may include inserting, when content is included in the row into which the intermediate blank space is inserted, the intermediate blank space into the upper end of the content included in the row.

The content information may include information about the content of the original document and information about a content format of the original document.

A size of the single sheet of the content layer and a size of the single sheet of the frame layer may be set based on the number of pages of the original document and the layout information.

The content of the content layer may be arranged in a single line on the single sheet of the content layer based on the content information.

The frame layer may include internal regions, and the internal regions may be regions in the converted document in which the content of the content layer is placed because the content layer and the frame layer overlap.

The frame layer may further include an external region, and the external region may include at least one piece of additional information about the converted document and may be a region on the converted document in which the additional information is placed because the content layer and the frame layer overlap.

The additional information may be at least one of introduction, conclusion, page numbers, and time.

The method may further include generating at least one sub-frame layer corresponding to the frame layer, wherein the sub-frame layer may include an external region, the external region may include at least one piece of additional information about the converted document and may be a region in the converted document in which the additional information is placed because the content layer and the frame layer overlap.

The page frames may separate the internal regions from the external region of the frame layer.

The page frames may separate the internal regions from the external region at boundaries between the internal regions and the external region of the frame layer.

Corners of the page frames may have at least one of a box shape, a cramp iron shape, a circular shape, and transparency, and boundaries of the page frames are at least one of a solid line, a broken line, and a dot-and-dash line.

The method may further include outputting the converted document through an interface of a web browser, wherein the outputting of the converted document may include outputting the converted document with a plurality of pages visually existing in the converted document, spaced apart from each other.

According to another aspect of the present application, there may be provided an apparatus for converting a document, the apparatus including: an original document providing unit configured to load a document file about an original document generated to have a plurality of pages through a word processing program on a local device; a document converting unit configured to extract content information about content of the original document and layout information about a page layout of the original document from the document file, generate a content layer composed of a single sheet including content corresponding to the content of the original document by using the content information, generate a frame layer composed of a single sheet including as many page frames as the number of pages of the original document based on the layout information, and insert an intermediate blank space into a separating position corresponding to a page boundary of the original document on the single sheet of the content layer based on the layout information; and a converted document generator configured to generate a converted document composed of a single sheet in which the content layer and the frame layer overlap and visually providing a page separation substantially the same as a page separation of the original document.

1. Electronic Document Converting System

Hereinafter, an electronic document converting system 10000 according to an exemplary embodiment of the present application will be described.

In this specification, the electronic document converting system 10000 denotes a system that converts an electronic document (referred to as "original document" below) generated through a word processing program or a word processing application into an electronic document (referred to as "converted document" below) in a web-compatible form. Here, the phrase "original document" denotes a document that is a target of conversion and is not necessarily a document that is generated or created originally. In other words, an "original document" may be a copied document or an edited or modified document from the viewpoint of an electronic file.

1.1 Original Document

An original document may be created through various word processing programs or word processing applications.

In this specification, an original document should be interpreted by a comprehensive meaning including all electronic documents in various forms, such as 1) text-based documents created through Windows Notepad, Microsoft Word, etc. based on an existing typewriter, 2) spreadsheet-type documents of Microsoft Excel, etc., and 3) presentation sheet-type documents of Microsoft PowerPoint, etc.

Also, an original document should be interpreted as including electronic documents generated based on a web office as well as electronic documents created using a program installed on a local device 1000.

Therefore, original documents may be 1) electronic documents created based on word processing programs installed on a personal computer (PC), such as WordPad and Notepad which is a Windows-embedded program, Word, Excel, and PowerPoint of the Microsoft Office program group, Writer, Impress, and Calc of the LibreOffice program group, Hangul, Hanshow, and Hancell of the Hancom Office program group, Pages, Keynote, and Numbers of the iWork program group of Apple, and Acrobat of Adobe, or 2) electronic documents created through applications frequently run on a web browser, such as Google Docs, Google Spreadsheet, and Google Presentation operating in conjunction with Google Drive, iWork applications included in Apple iCloud, Word, Excel, PowerPoint, and OneNote operating in conjunction with Microsoft OneDrive, and a document viewer, Naver Word, Naver Slide, and Naver Cell of Naver Ndrive.

Needless to say, the aforementioned programs and applications are only examples of programs and applications for creating electronic documents, and original documents may be generated through other programs and applications. When an original document is generated through an application based on a web office, the application may be frequently based on hypertext markup language version 5 (HTML5) but is not necessarily limited to HTML5.

1.2 Converted Document

A converted document is an electronic document in a web-compatible form generated using an original document. Here, an electronic document in a web-compatible form is an electronic document that may be processed through a web browser. Therefore, a converted document may be basically viewed through a web browser and may be edited through the web browser as necessary. To this end, for example, the converted document may be a JavaScript Object Notation (JSON) format internally based on HTML5 on the web browser. Needless to say, the form of a converted document is not limited to the aforementioned example, and a converted document may also be processed in another format using another markup language, for example, extensible markup language (XML) or so on.

In this specification, a converted document may be in a format that conforms to a web standard as much as possible for general use such that a web browser may process the converted document without any additional plug-in. Therefore, in this specification, a converted document may be processed through Microsoft Internet explorer (IE), Google Chrome, Firefox, Safari, Opera, and various other web browsers. In some cases, a plug-in may be necessary, and thus the present application does not exclude cases where some converted documents use plug-ins.

1.3 Configuration of Electronic Document Converting System

A configuration of the electronic document converting system 10000 for converting an original document into a converted document will be described below.

FIG. 1 is a block diagram showing elements of an electronic document converting system according to an exemplary embodiment of the present application.

Referring to FIG. 1, the electronic document converting system 10000 may include an original document providing unit 11000, a document converting unit 12000, and a converted document output unit 13000. The original document providing unit 11000 loads an original document, the document converting unit 12000 generates a converted document by converting the original document, and the converted document output unit 13000 outputs the converted document.

To implement the aforementioned electronic document converting system 10000, a plurality of electronic devices connected via a network or a single electronic device that comprehensively serves as electronic devices connected via a network may be used. In this specification, the electronic document converting system 10000 is basically implemented as the former (referred to as "network type" below) but may be implemented as the latter (referred to as "stand-alone type" below) in some cases.

Meanwhile, the elements of the electronic document converting system 10000 described above have been functionally classified, and thus these elements may be physically disposed in a single electronic device or in a plurality of electronic devices connected via a network in a distributed manner.

As an example in which the elements of the electronic document converting system 10000 are disposed in a plurality of electronic devices, the document converting unit 12000 may exist in an electronic device corresponding to a server 2000 which will be described below, and the original document providing unit 11000 and the converted document output unit 13000 may exist in an electronic device corresponding to a local device 1000 which will be described below.

1.3.1 Network Type

Figure 2:
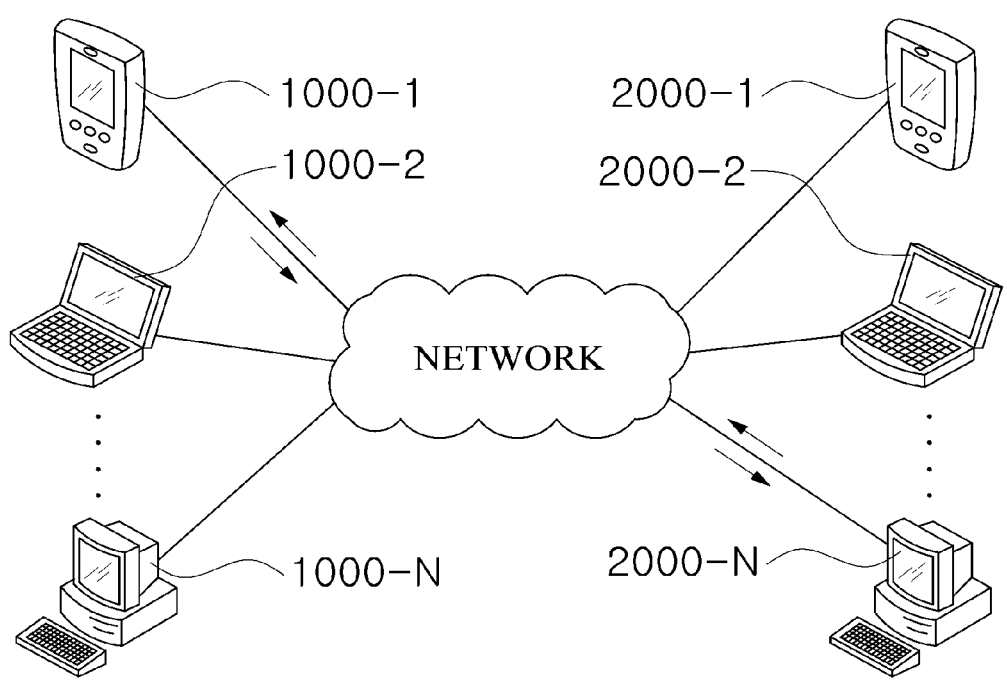
FIG. 2 is a block diagram of an example of physical elements of an electronic document converting system according to an exemplary embodiment of the present application.

FIG. 2 is a block diagram of an example of physical elements of an electronic document converting system according to an exemplary embodiment of the present application.

According to a scenario, the electronic document converting system 10000 may include electronic devices physically connected via a network (for example, the Internet) as shown in FIG. 2. Here, one electronic device may correspond to the server 2000, and other electronic devices may correspond to local devices 1000. Also, functions of the original document providing unit 11000, the document converting unit 12000, and the converted document output unit 13000 may be implemented by one of the server 2000 and a local device 1000 or cooperation between the server 2000 and a local device 1000.

For example, according to this scenario, document conversion may be performed as follows. A local device 1000 connects to the server 2000 through a web browser and transmits an original document stored in advance to the server 2000. The server 2000 receives the original document, generates a converted document by converting the original document, and then transmits the converted document to the local device 1000. The local device 1000 receives the converted document and displays the converted document through a web browser.

In another example, according to this scenario, document conversion may be performed as follows. A local device 1000 connects to the server 2000 through a web browser and acquires a web application for document conversion from the server 2000 through the web browser. Then, the local device 1000 may run the web application on the web browser to convert an original document and display the converted document through the web browser.

In addition, according to this scenario, the server 2000 may be a single physical object or may be implemented as a plurality of devices that are physically separated. For example, the server 2000 may be implemented in a form in which a web server hosting a web site to handle connection with a local device 1000 and data transmission and reception, such as a request, a response, and so on, through a web browser, an application server performing document conversion, and a database storing various data required for hosting a web site or processing an application are all integrated in one device, or in a form in which at least some of the web server, the application server, and the database are separated into a plurality of devices.

1.3.2 Stand-Alone Type

Figure 3:
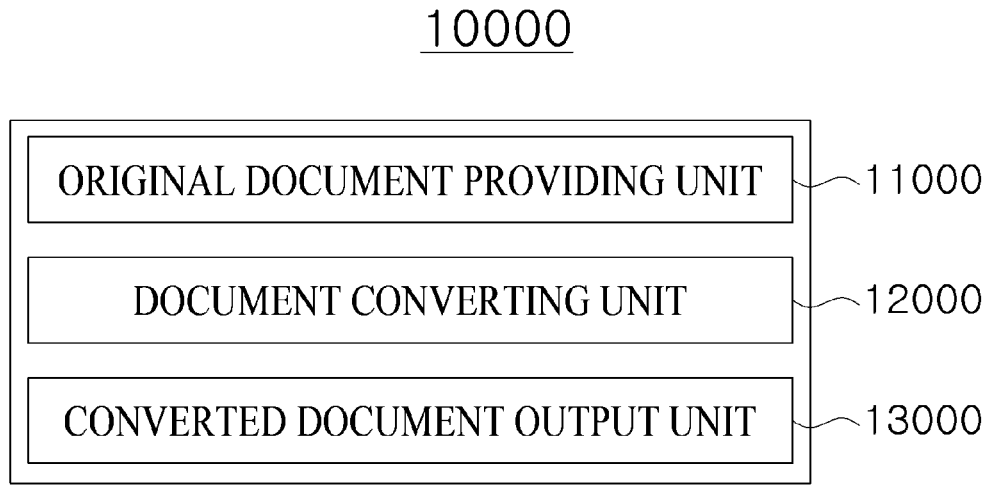
FIG. 3 is a block diagram of another example of physical elements of an electronic document converting system according to an exemplary embodiment of the present application.

FIG. 3 is a block diagram of another example of physical elements of an electronic document converting system according to an exemplary embodiment of the present application.

According to another scenario, the electronic document converting system 10000 may be configured as a single electronic device as shown in FIG. 3. For example, conversion of an electronic document may be processed by the single electronic device in a stand-alone manner, and all functions of the original document providing unit 11000, the document converting unit 12000, and converted document output unit 13000 may be implemented by the single electronic device.

For example, in this scenario, the electronic device may convert an original document into a converted document by itself and then display the converted document through a web browser.

1.3.3 Configuration of Server/Local Device/Single Electronic Device

The above-described combination of the server 2000 and a local device 1000 according to a network type or the above-described standalone-type single electronic device is required to perform various functions including communication, storage, calculation, etc. to operate as the electronic document converting system 10000. Detailed configurations of the server 2000, the local device 1000, and the single electronic device for the functions will be described in brief.

Figure 4:
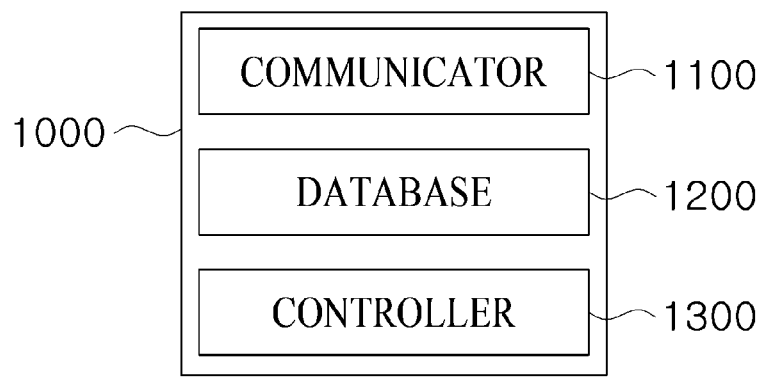
FIG. 4 is a block diagram of elements of a server according to an exemplary embodiment of the present application.

First, FIG. 4 is a block diagram of elements of the server 2000 according to an exemplary embodiment of the present application.

Referring to FIG. 4, the server 2000 may include a communicator 1100, a database 1200, and a controller 1300.

The communicator 1100 may communicate with an external device (e.g., a local device 1000). Therefore, the server 2000 may exchange information with the external device through the communicator 1100. For example, using the communicator 1100, the server 2000 may receive an original document from the local device 1000 which is connected to the server 2000 through a web browser or transmit a converted document to the local device 1000.

Here, the communication, that is, transmission and reception of data may be performed in a wired or wireless manner. To this end, the communicator 1100 may be configured as a wired communication module connecting to the Internet, etc. through a local area network (LAN), a mobile communication module connecting to a mobile communication network via a mobile communication base station and exchanging data, a short-range communication module using a wireless local area network (WLAN) communication method, such as wireless fidelity (Wi-Fi), or a wireless personal area network (WPAN) communication method, such as Bluetooth or ZigBee, a satellite communication module using global navigation satellite system (GNSS) such as global positioning system (GPS), or a combination thereof.

The database 1200 may store various kinds of information. The database 1200 may store data temporarily or semi-permanently. For example, the database 1200 of the server 2000 may store an operating system (OS) for running the server 2000, data for hosting a web site, data about a program or an application (e.g., a web application) for document conversion, and so on. Besides, an original document received from the local device 1000, a converted document, etc. may be stored.

Examples of the database 1200 may be a hard disk drive (HDD), a solid state drive (SSD), a flash memory, a read-only memory (ROM), a random access memory (RAM), and so on. The database 1200 may be provided as an embedded type or an attachable/detachable type.

The controller 1300 controls overall operation of the server 2000. To this end, the controller 1300 may calculate and process various kinds of information and control operations of the elements of the server 2000. For example, the controller 1300 may execute a program or an application for document conversion. The controller 1300 may be implemented as a computer or a similar device according to hardware, software, or a combination thereof. The controller 1300 may be provided as hardware in the form of an electronic circuit that performs a control function by processing an electrical signal, and may be provided as software in the form of a program for operating the hardware controller 1300. Meanwhile, unless there is a particular mention, operations of the server 2000 may be understood to be performed under the control of the controller 1300.

Figure 5:
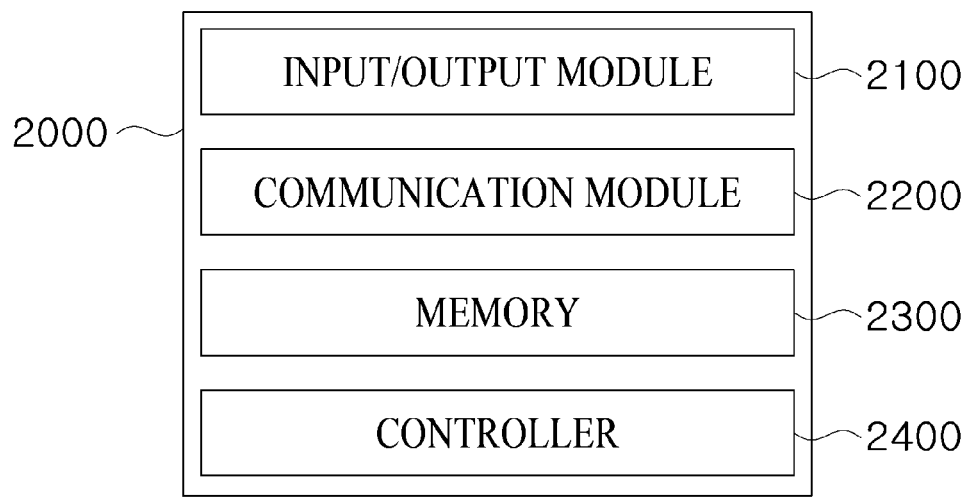
FIG. 5 is a block diagram of elements of a local device according to an exemplary embodiment of the present application.

Next, FIG. 5 is a block diagram of elements of a local device 1000 according to an exemplary embodiment of the present application.

The local device 1000 may include an input/output module 2100, a communication module 2200, a memory 2300, and a controller 2400.

The communication module 2200, the memory 2300, and the controller 2400 may be implemented similarly as the communicator 1100, the database 1200, and the controller 1300 of the server 2000 described above.

Accordingly, for example, the local device 1000 may connect to the server 2000 through a web browser using the communication module 2200 and transmit an original document to the server 2000 or receive a converted document from the server 2000. Also, the memory 2300 of the local device 1000 may store an OS for operating the local device 1000, the web browser, and so on. Besides, a word processing program or an application (e.g., a web application executed on the web browser) for generating an original document, an original document, a converted document, etc.

may be stored. The controller 2400 may execute the web browser, the word processing program or application, and so on.

The input/output module 2100 may be various interfaces, connection ports, etc. that receive a user input or output information to a user. The input/output module 2100 may be divided into an input module and an output module, and the input module receives a user input from the user. The user input may be made in various forms including a key input, a touch input, and a voice input. The input module that may receive a user input has a comprehensive meaning including not only an existing keypad, keyboard, and mouse but also all of a touch sensor for sensing a touch of a user, a microphone for receiving a voice signal, a camera for recognizing a gesture, etc. through image recognition, a proximity sensor configured as an illumination sensor, an infrared sensor, etc. for detecting a user's approach, a motion sensor for recognizing a user's motion through an accelerometer, a gyro sensor, etc., and various input means for sensing or receiving a variety of other user inputs. Here, the touch sensor may be implemented as a touch panel attached to a display panel, a piezoelectric or capacitive touch sensor for sensing a touch through a touch film, an optical touch sensor for detecting a touch in an optical manner, or so on. Besides, the input module may be implemented in the form of an input interface (a universal serial bus (USB) port, a personal system/2 (PS/2) port, or so on) for connecting to an external input device which receives a user input rather than a device for sensing a user input by itself. Also, the output module may output and provide various kinds of information to a user. The output module has a comprehensive meaning including all of a display for outputting an image, a speaker for outputting a sound, a haptic device for generating a vibration, and output means in various other forms. Besides, the output module may be implemented in the form of a port-type output interface for connecting to the aforementioned individual output means.

For example, the output module in the form of a display may display text, still images, and videos. In a broad sense, the display denotes an image display device including all of a liquid crystal display (LCD), a light-emitting diode (LED) display, an organic light-emitting diode (OLED) display, a flat panel display (FPD), a transparent display, a curved display, a flexible display, a three dimensional (3D) display, a holographic display, a projector, and various other devices capable of performing an image output function. The display may be a touch display integrated with the touch sensor of the input module.

Finally, a single electronic device constituting the stand-alone-type electronic document converting system 10000 may include an input/output module, a memory, and a controller, which may be implemented similarly to the input/output module 2100, the database and memory 1200 and 2300, and the controllers 1300 and 2400 described above. Also, the single electronic device may include a communication module as necessary, which may also be implemented similarly to the communicator 1100 and the communication module 2200 described above.

Meanwhile, the local device 1000 and the single electronic device may be mainly provided as a personal computer (PC) in a desktop or laptop form. In addition to a desktop computer or a laptop, a tablet, a smartphone, etc. may be used as the local device 1000 or the single electronic device. Needless to say, the local device 1000 or the single electronic device is not limited to the aforementioned examples, and other devices that perform similar functions may be used as the local device 1000 or the single electronic device.

2. Electronic Document Conversion Operation

The electronic document converting system 10000 according to an exemplary embodiment of the present application may perform an electronic document conversion operation for converting an original document 3000 into a converted document 6000. The electronic document converting system 10000 performing an electronic document conversion operation denotes that a local device and/or a single electronic device may perform the conversion operation.

Figure 6:
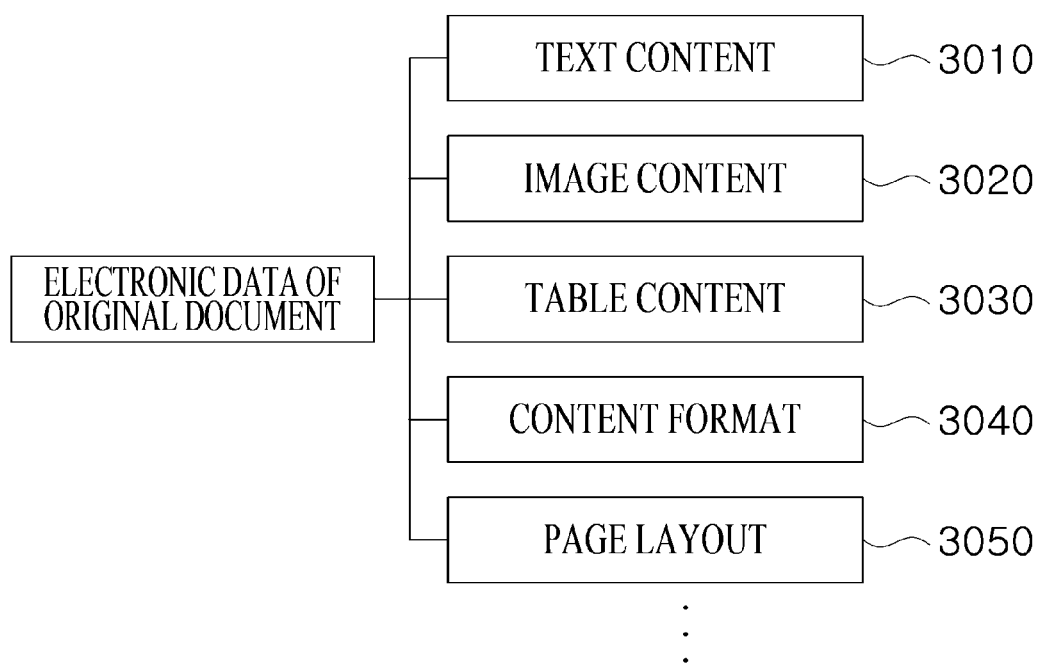
FIG. 6 is a diagram schematically showing electronic data that may be included in an original document according to an exemplary embodiment of the present application.

FIG. 6 is a diagram schematically showing electronic data that may be included in an original document according to an exemplary embodiment of the present application.

Referring to FIG. 6, the original document 3000 may include electronic data. The electronic data may generally include text content 3010, image content 3020, table content 3030, a content format 3040, a page layout 3050, and/or so on.

The text content 3010 of the original document 3000 may denote text data input to the original document 3000. the text content 3010 of the original document 3000 may include text data in a line form, text data in a paragraph form, white space between text data, and so on.

The content format 3040 of the original document 3000 may be data relating to attributes of content, such as the text content 3010, the image content 3020, the table content 3030, and so on. For example, the content format 3040 may be data relating to a shape attribute of the text content 3010. As examples of data relating to the shape attribute, the content format 3040 may include a font, a color, etc. of the text content, a boundary, left and right margin, etc. of the image content 3020, and a cell base color, a cell size, etc. of the table content 3030.

The image content 3020 of the original document 3000 may denote image data inserted into the original document 3000. For example, images, etc. may be inserted into the original document 3000 independently from the text content 3010, and the inserted images may be the image content 3020.

The table content 3030 of the original document 3000 may denote table data inserted into the original document 3000. Even data included in the table data may be the table content 3030. For example, when text data or image data is included in table data, the text data or the image data included in the table data as well as the table data may be the table content 3030.

The page layout 3050 of the original document 3000 may indicate electronic data relating to a page form of the original document 3000. For example, the page layout 3050 of the original document 3000 may indicate electronic data about a page size, blank spaces in a page, columns in a page, and/or paper orientation. Also, when the original document 3000 has a plurality of pages according to the electronic data, the page layout 3050 of the original document 3000 may include information on a boundary 3100 between pages, and so on.

Figure 7:
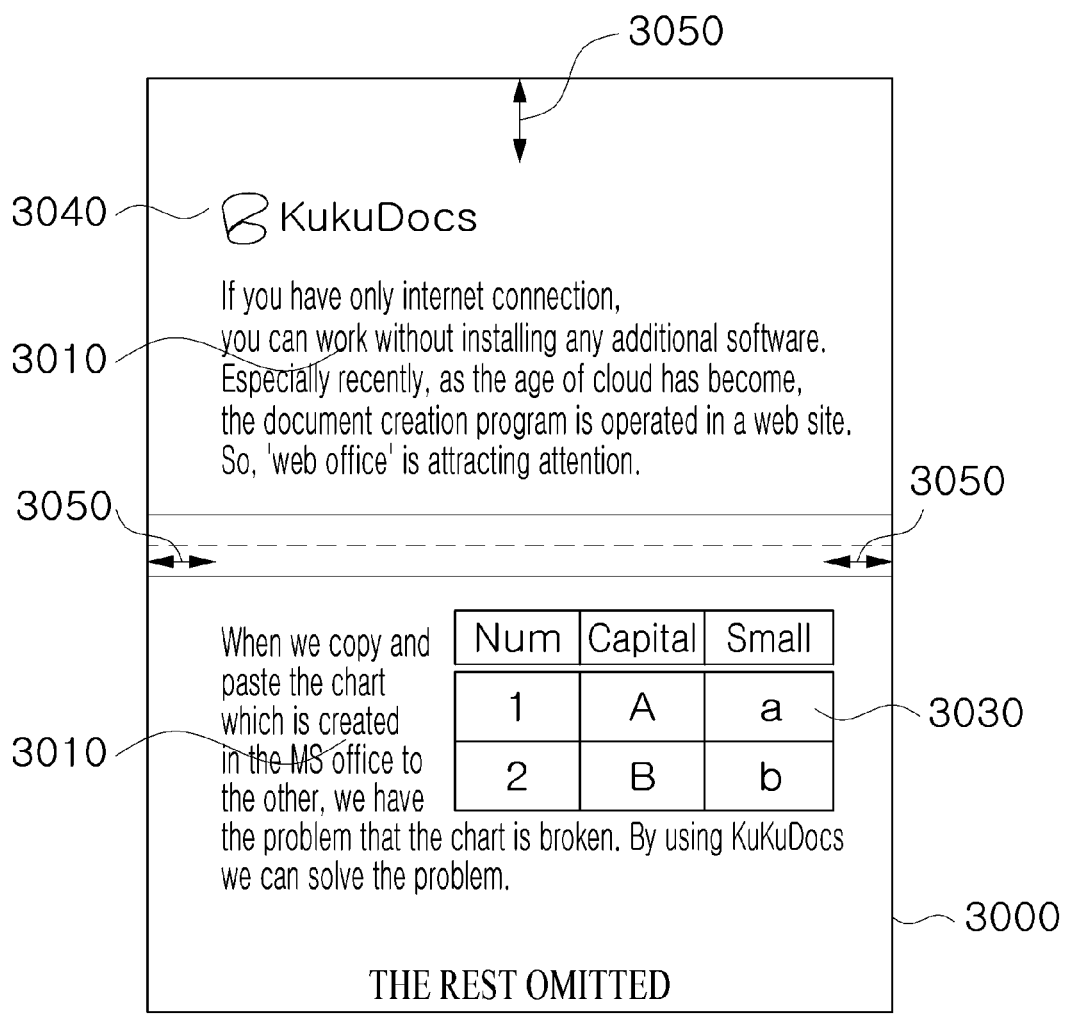
FIG. 7 is a diagram showing a form in which the electronic data included in the original document is output according to an exemplary embodiment of the present application.

Meanwhile, the electronic data included in the original document 3000 is not essential electronic data that the original document 3000 should include, and the original document 3000 may have more or less electronic data FIG. 7 is a diagram showing a form in which the electronic data included in the original document is output according to an exemplary embodiment of the present application.

Referring to FIG. 7, it is possible to be seen that an original document 3000 according to an embodiment of the present application is output according to the above-described electronic data. According to the page layout 3050, top and bottom, right and left margins may be applied to the page of the original document, and then the original document may be output. In addition, according to the above-described various types of content and content format 3040, the content having a predetermined content format 3040 may be generated such that the page of the original document conforms the page layout information, and then the original document may be output. As a result, according to the combination of the electronic data, the original document may be output with various visual forms.

Meanwhile, as described above, the electronic document converting system 10000 may include the original document providing unit 11000, the document converting unit 12000, and the converted document output unit 13000. These units perform their operations for performing an electronic document conversion operation of the electronic document converting system 10000. Electronic document conversion operation of each unit will be described below.

2.1 Operation of Original Document Providing Unit

The original document providing unit 11000 according to an exemplary embodiment of the present application may perform an operation of loading the original document 3000 onto the electronic document converting system 10000. For example, the original document providing unit 11000 may load the original document 3000 onto a server in a network-type system and/or a single electronic device in a stand-alone-type system.

In a broad sense, loading is for providing and/or transmitting a file of the original document 3000 to the system 10000 and may also include a limited meaning of storing the file of the original document 3000 in a server, a network and/or in the memory 2300 of the single electronic device.

Also, the system 10000 including the original document providing unit 11000 may load a document onto the system 10000 or another system.

When the original document 3000 is loaded onto the electronic document converting system 10000, the electronic document converting system 10000 may prepare and/or perform an electronic document conversion operation. According to operations of the document converting unit 12000 and/or the converted document output unit 13000, the original document 3000 may be converted into the converted document 6000. It will be described below.

Figure 8:
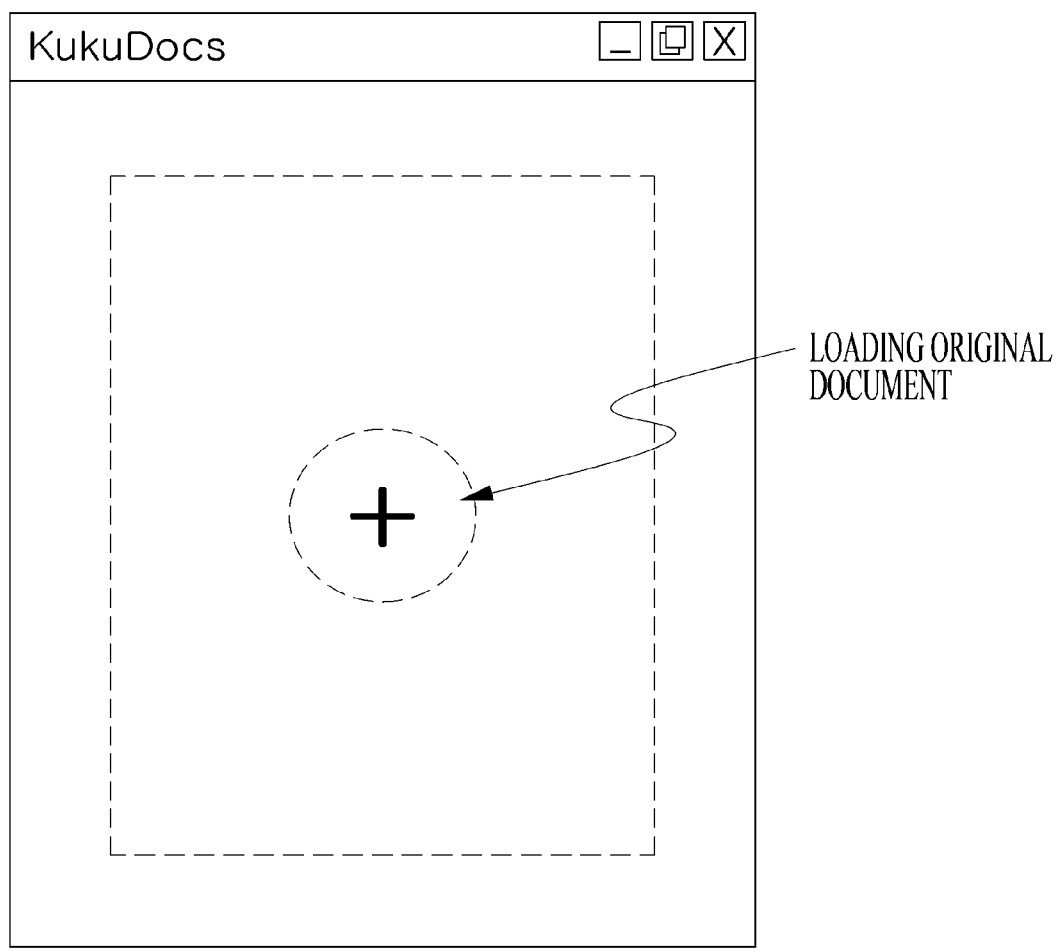
FIG. 8 is a diagram showing an interface that may be provided by an original document providing unit according to an exemplary embodiment of the present application.

FIG. 8 is a diagram showing an interface that may be provided by an original document providing unit according to an exemplary embodiment of the present application.

Referring to FIG. 8, when a user uses the electronic document converting system 10000, the original document providing unit 11000 may provide an interface for acquiring the original document 3000. By using the interface, user may load the original document 3000 onto the electronic document converting system 10000.

The interface may be output through an output portion of each element in the electronic document converting system 10000.

2.2 Operation of Document Converting Unit

The document converting unit 12000 according to an exemplary embodiment of the present application may perform an operation of converting the original document 3000 loaded onto the electronic document converting system 10000 into the converted document 6000 according to a series of operations.

The document converting unit 12000 may perform an operation of generating a content layer 4000 provided as a single sheet, an operation of generating a frame layer 5000 provided as a single sheet, an operation of vertically spacing parts of the content layer 4000, an operation of generating the converted document 6000, and other operations.

In this specification, a single sheet may be a document file that has a visual layout, such as predetermined upper, left, and right blank spaces, but is provided as a single sheet without any page separation. Also, a single sheet is a web-compatible electronic document like the converted document 6000 described above, and may be an electronic document file created with a markup language that may be processed through a web browser.

Figure 9:
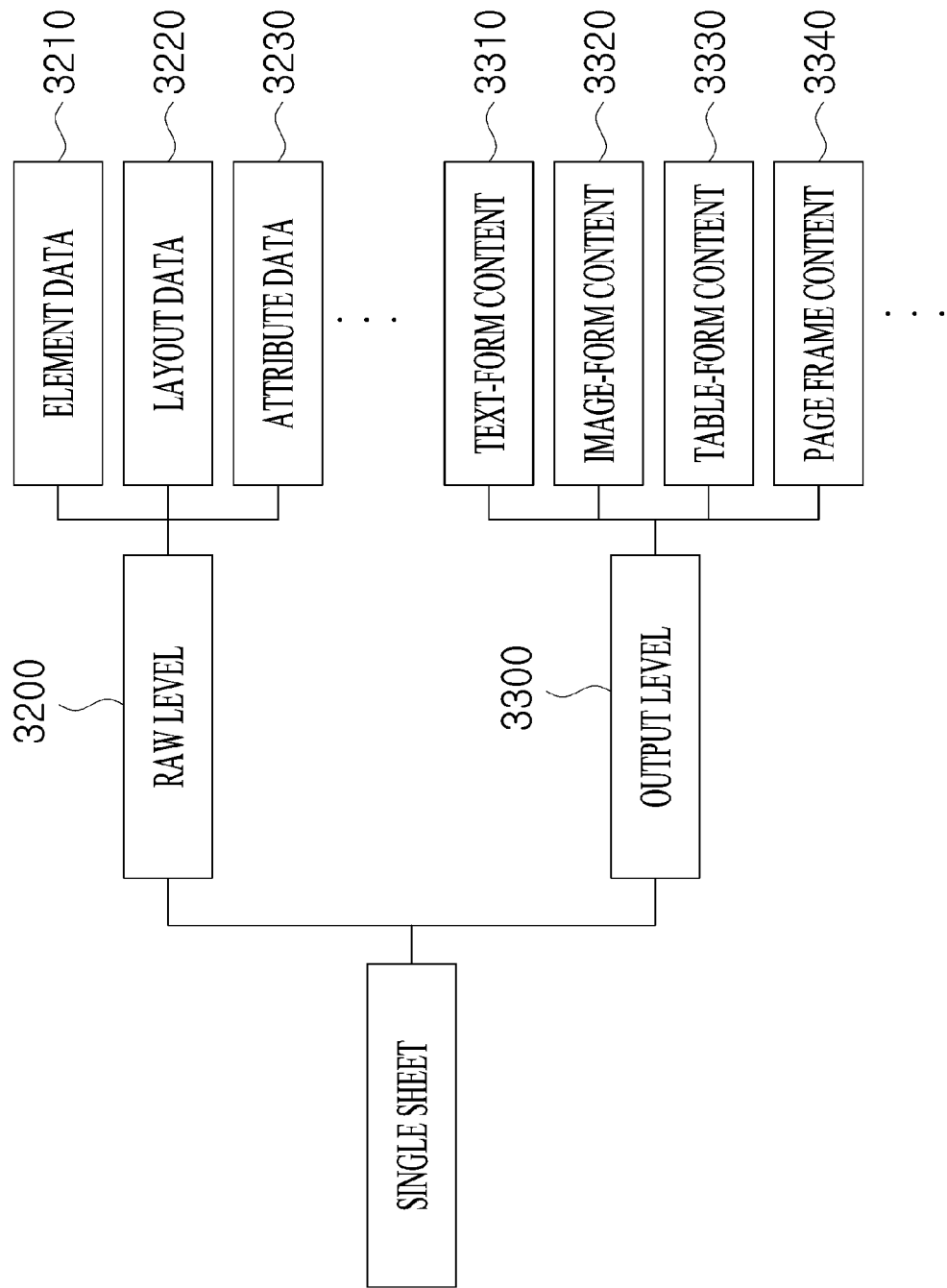
FIG. 9 is a diagram showing electronic data that is included in a single sheet as an example according to an exemplary embodiment of the present application.

FIG. 9 is a diagram showing electronic data that is included in a single sheet as an example according to an exemplary embodiment of the present application.

Referring to FIG. 9, a single sheet according to an exemplary embodiment of the present application may include electronic data at a raw level 3200 and/or electronic data at an output level 3300.

Here, as raw-level electronic data, the single sheet according to an exemplary embodiment of the present application may include element data 3210, layout data 3220, attribute data 3230, category data, image data, table data, and/or so on. At the output level 3300, the electronic data may include text-form content 3310, image-form content 3320, table-form content 3330, page frame content 3340, etc. as electronic data.

The electronic data at the raw level 3200 of the single sheet according to an exemplary embodiment of the present application and the electronic data at the output level 3300 may have a correlation.

For example, the single sheet can be configured with raw-level electronic data at the raw level 3200 and visually output at the output level 3300 through a process of rendering the raw-level electronic data.

At the raw level 3200, the single sheet may have the element data 3210 including line text, paragraph text, white space, etc. Also, there may be the attribute data 3230 defining attributes, such as a font, a text size, a space between letters, etc. Due to the layout data 3220 used for determining a basic layout of the single sheet, the element data may be visually output to conform Accordingly, at the output level 3300, the text, the white space, etc. of the element data 3210 may be output as the text-form content 3310. And the attribute data 3230 may be applied to the text-form content 3310. Also, the text content 3010 may be disposed according to the layout data 3220 with a blank space at the upper end or on the left and right sides.

Meanwhile, a process of relating the electronic data of the raw level 3200 and the electronic data of the output level 3300 may be performed by the document converting unit 12000.

A series of operations of the document converting unit 12000 will be described below.

2.2.1 Generation of Content Layer

The document converting unit 12000 according to an exemplary embodiment of the present application may generate the content layer 4000 that is a single sheet including raw-level electronic data corresponding to the electronic data of the original document 3000. Here, the content layer 4000 generated by the document converting unit 12000 may be either singular or plural in number.

For example, the document converting unit 12000 may generate the content layer 4000 through a process of extracting the electronic data of the original document 3000.

As a detailed example of the process of extracting the electronic data of the original document 3000, the document converting unit 12000 may also generate electronic data that may be used at the raw level 3200 of the single sheet. The electronic data of the single sheet at the raw level may be generated through a process of extracting and matching the electronic data of the original document 3000 to raw-level electronic data stored in the document converting unit 12000 in advance.

Meanwhile, when raw-level electronic data is generated from the electronic data of an original document according to an exemplary embodiment of the present application, the raw-level electronic data may not be generated from all of the electronic data of the original document. In other words, the document converting unit 12000 can selectively generate raw-level electronic data, an example of which will be described below.

The document converting unit 12000 according to an exemplary embodiment of the present application may extract the text content 3010 of the original document 3000 and generate the element data 3210 of a single sheet. Also, the element data 3210 may include white space as well as text data.

Also, when the text of the original document 3000 has a form, the document converting unit 12000 may match corresponding form data to the text and generate the attribute data 3230.

Also, the document converting unit 12000 can extract data relating to predetermined blank spaces, such as an upper blank space, left and right blank spaces, a lower blank space, etc., from the page layout 3050 and generate the layout data 3220.

Meanwhile, the document converting unit 12000 may generate image data and table data at the raw level 3200 from the image content 3020 and/or the table content 3030 of the original document 3000. Also, when the image content 3020 and/or the table content 3030 have content formats, form information relating to the content formats may be applied to the image data and/or the table data.

As a result, the document converting unit 12000 according to an exemplary embodiment of the present application can generate a single sheet including electronic data without any visual page separation at an output stage by configuring the generated raw-level electronic data at the raw level 3200.

As an example, the document converting unit 12000 may configure the element data 3210 generated at the raw level 3200 as the layout data 3220 and apply the attribute data 3230 to the element data 3210, thereby generating a document in a web-compatible format. At this time, a method of the document converting unit 12000 configuring data at the raw level 3200 is preferably a method of coding a predetermined markup language.

Figure 10:
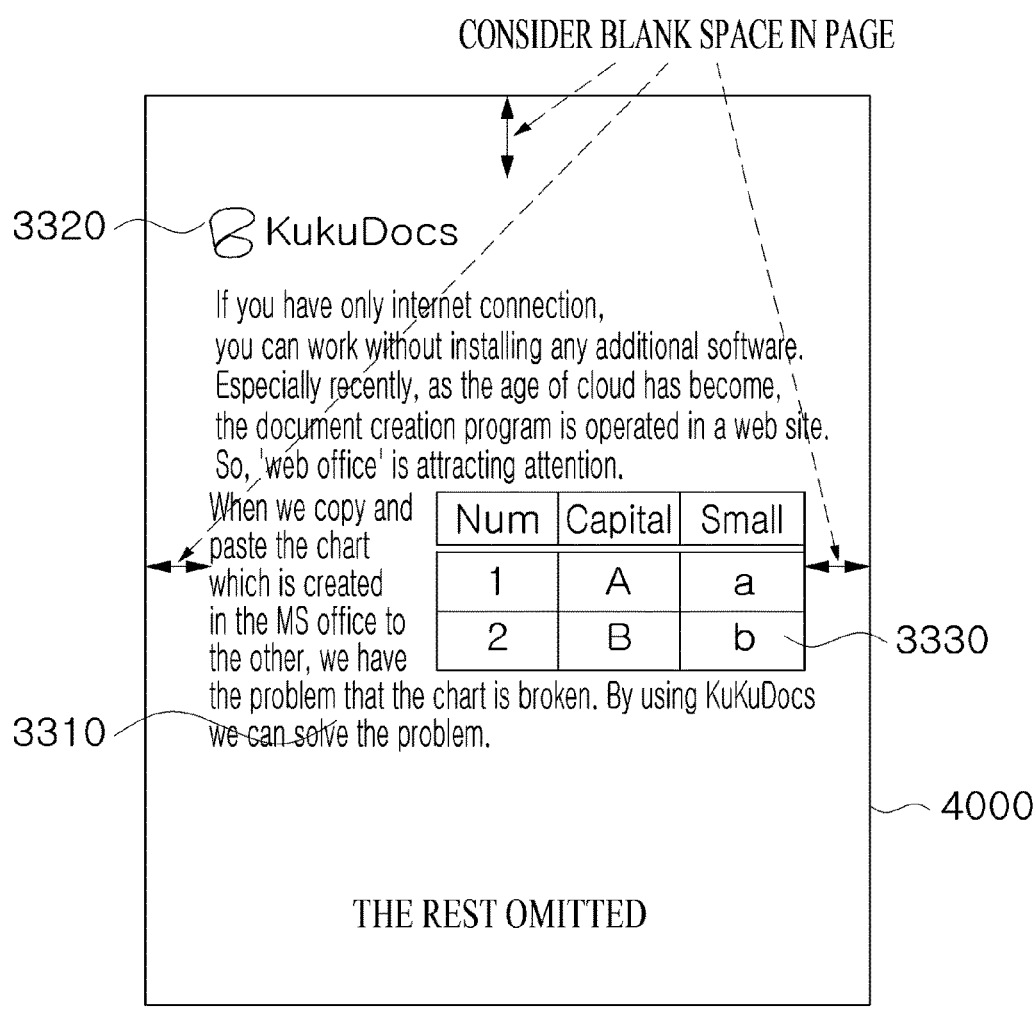
FIG. 10 is a diagram illustrating a content layer according to an exemplary embodiment of the present application.

FIG. 10 is a diagram illustrating a content layer according to an exemplary embodiment of the present application.

Referring to FIG. 10, as a result, the content layer 4000 may denote a document in a web-compatible format including the text-form content 3310, the table-form content 3330, and the image-form content 3320, which are obtained by converting the electronic data of the raw level 3200. The converted electronic data of content layer 4000 may be output at the output level 3300 without any page separation. It is possible to see that content of the content layer 4000 is configured based on the page layout 3050, such as an upper blank space, left and right blank spaces, a lower blank space, etc., of the original document 3000.

An operation performed by the document converting unit 12000 to vertically space parts of electronic data included in the content layer 4000 apart at the output level 3300 will be described below.

2.2.2 Operation of Vertically Spacing Parts of Content Layer Apart

The document converting unit 12000 according to an exemplary embodiment of the present application may vertically space parts of the electronic data included in the content layer 4000 apart.

As a method of vertically spacing parts of the content layer 4000 apart, an intermediate blank space 4200 may be inserted into the content layer 4000.

In this specification, the intermediate blank space 4200 may denote a certain object that can be inserted into the content layer 4000 at the raw level 3200 or the output level 3300.

For example, at the raw level 3200, the intermediate blank space 4200 may be the element data 3210 of white space or the attribute data 3230 that begins a new line and/or a new paragraph.

For example, at the output level 3300, the intermediate blank space 4200 may denote a space in a transparent color that may be inserted into an electronic document. However, the intermediate blank space 4200 is not limited to a transparent color and may also be a space in a predetermined color.

In other words, the intermediate blank space 4200 is not limited to the aforementioned electronic data of the raw level 3200 and can be any raw-level electronic data of the raw level 3200 that can serve as an intermediate blank space at the raw level 3200. And the intermediate blank space 4200 may be any object that can visually space parts of a configuration of the content layer 4000 apart.

Accordingly, inserting the intermediate blank space 4200 into the content layer 4000 according to an exemplary embodiment of the present application may denote that the document converting unit 12000 generates the element data 3210 for white space or the attribute data 3230 for beginning a new line and inserts the element data 3210 or the attribute data 3230 at the raw level 3200. Alternatively, inserting the intermediate blank space 4200 may also denote that the document converting unit 12000 generates an image whose parts are spaced apart by inserting the intermediate blank space 4200 into an image in which the content layer 4000 is visually output.

An operation of the document converting unit 12000 for vertically spacing parts of the content layer 4000 apart according to an exemplary embodiment of the present application can be an operation of inserting the intermediate blank space 4200 into a position of the content layer 4000 corresponding to the page boundary 3100 of the original document 3000 at the raw level 3200 and/or the output level 3300.

A position on the content layer 4000 into which the intermediate blank space 4200 is inserted will be described below.

2.2.2.1 Determination of Separating Position

The document converting unit 12000 according to an exemplary embodiment of the present application can determine a separating position 4100 of the content layer 4000.

Figure 11:
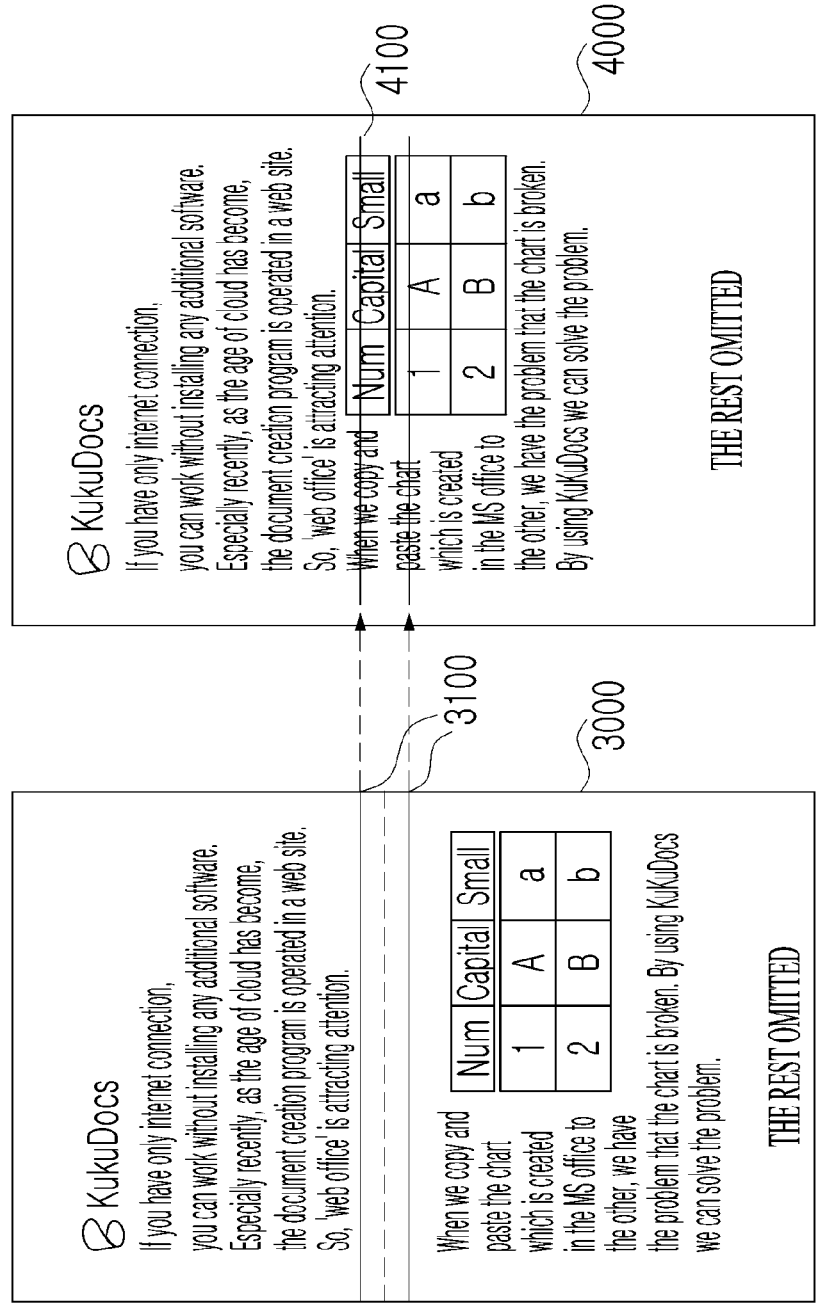
FIG. 11 is a diagram illustrating a separating position of a content layer according to an exemplary embodiment of the present application.

FIG. 11 is a diagram illustrating a separating position of a content layer according to an exemplary embodiment of the present application.

Referring to FIG. 11, the separating position 4100 according to an exemplary embodiment of the present application may be a position that is the same as or similar to a position of the page boundary 3100 of the original document 3000 on the content layer 4000 at the output level 3300.

Also, the separating position 4100 may indicate a row of raw-level electronic data of the content layer 4000 corresponding to the page boundary 3100 of the original document 3000 at the raw level 3200.

Meanwhile, when the original document 3000 has a plurality of pages, the page boundary 3100 of the original document 3000 may be a lower boundary of a page or an upper boundary of a page.

The document converting unit 12000 according to an exemplary embodiment of the present application may perform an operation of determining the separating position 4100 of the content layer 4000 based on the page layout 3050 of the original document 3000.

For example, the document converting unit 12000 may perform the operation of determining the separating position 4100 based on electronic data corresponding to the page boundary 3100 in information on the page layout 3050 of the original document 3000.

As a detailed example, the operation of determining the separating position 4100 may be an operation of extracting coordinate information corresponding to the page boundary 3100 of the original document 3000. And the operation of determining the separation position 4100 may be operation of detecting the separating position 4100 on the content layer 4000 corresponding to the coordinate information at the output level 3300.

Also, the operation of determining the separating position 4100 may also be an operation of extracting information on the page boundary 3100 from the page layout 3050 of the original document 3000, detecting raw-level electronic data existing ahead of the page boundary 3100 on the content layer 4000 at the raw level 3200, and determining the separating position 4100.

Meanwhile, the operation of determining the separating position 4100 based on the page boundary 3100 is not limited to the above methods and may be various operations in which it is possible to determine the separating position 4100.

2.2.2.2 Insertion of Intermediate Blank Space

An operation of inserting the intermediate blank space 4200 into the separating position 4100 of the content layer 4000 will be described below.

Figure 12:
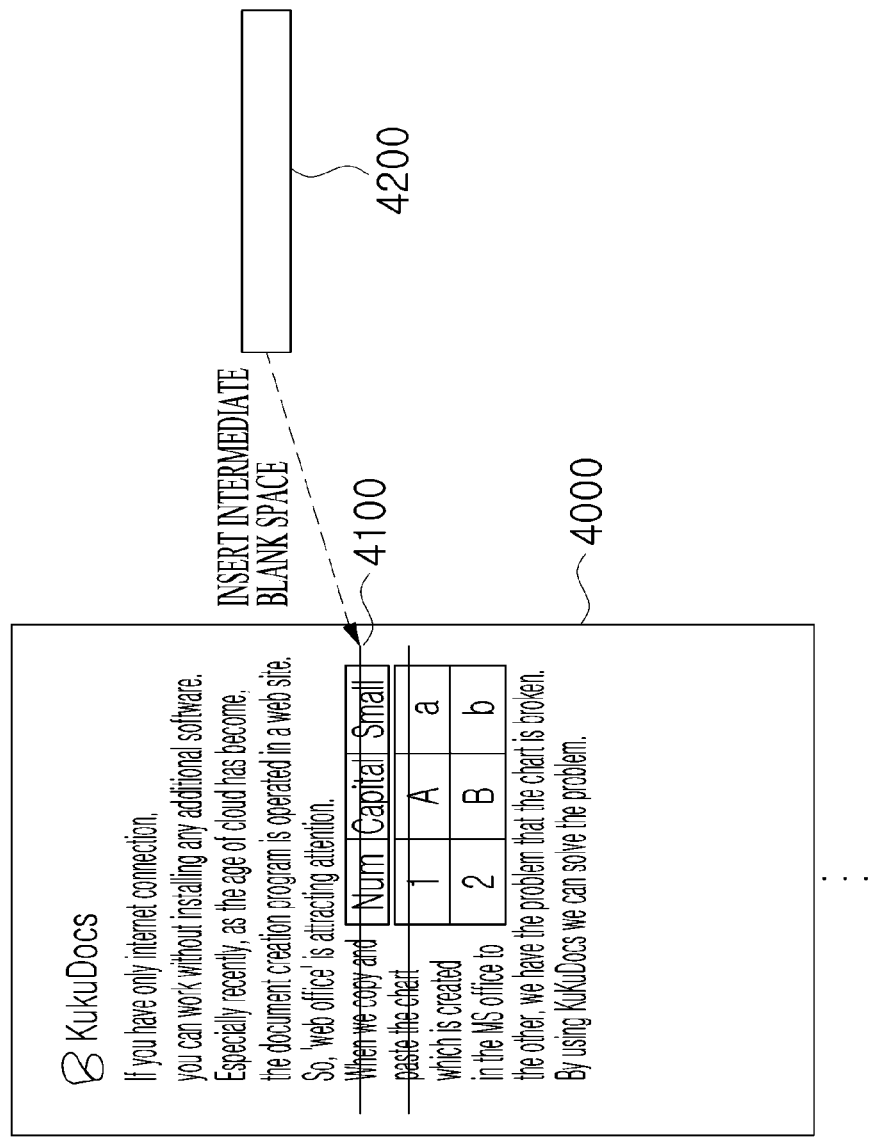
FIG. 12 is a diagram illustrating an operation of inserting an intermediate blank space into a separating position of a content layer according to an exemplary embodiment of the present application.

FIG. 12 is a diagram illustrating an operation of inserting an intermediate blank space into a separating position of a content layer according to an exemplary embodiment of the present application.

Referring to FIG. 12, the document converting unit 12000 according to an exemplary embodiment of the present application may perform an operation of vertically spacing parts of the content layer 4000 apart by inserting the intermediate blank space 4200 into the separating position 4100. As described above, the intermediate blank space 4200 may be inserted into the separating position 4100 on the content layer 4000 at the raw level 3200 or the output level 3300.

As a result, the intermediate blank space 4200 is inserted into the separating position 4100, such that the content layer 4000 may have a structure in which parts of the text content 3010, the image content 3020, the table content 3030, and/or so on are vertically spaced apart at the output level.

The intermediate blank space 4200 according to an exemplary embodiment of the present application may be a space having a specific size. A method of setting the size of the intermediate blank space 4200 will be described below.

Figure 13:
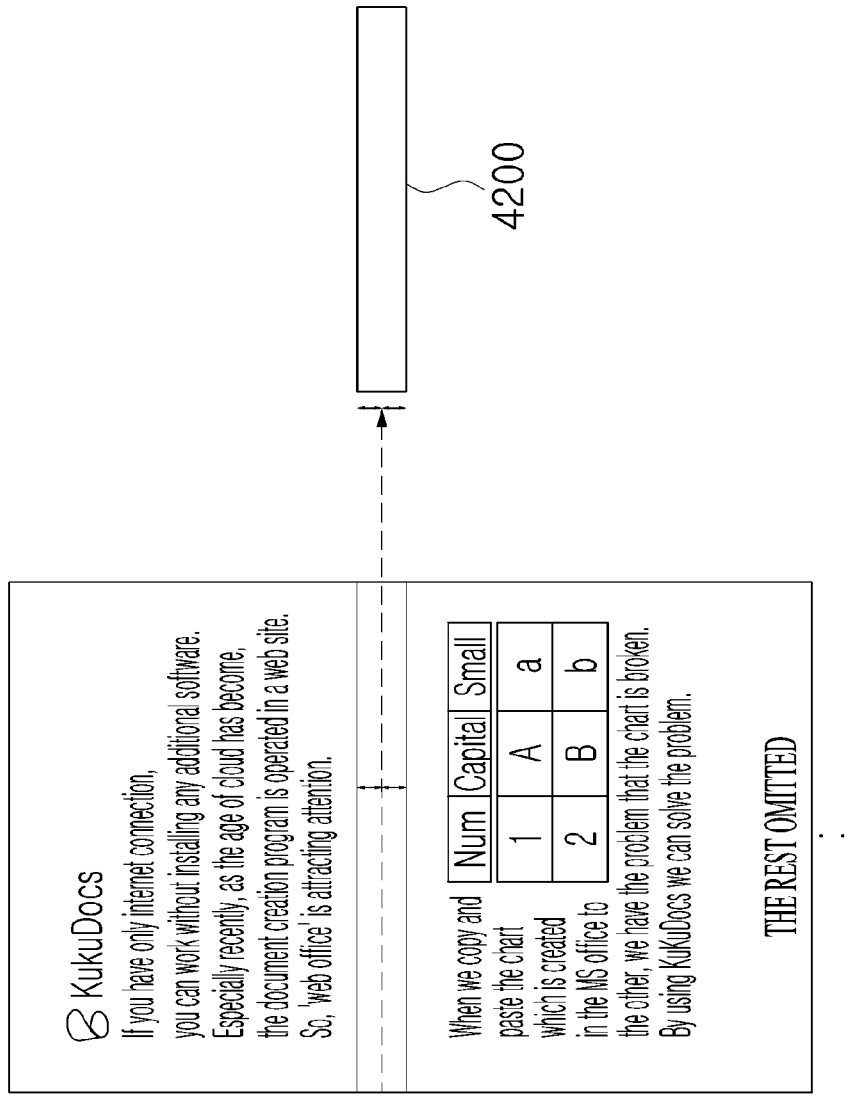
FIG. 13 is a diagram illustrating an upper blank space and a lower blank space of an original document according to an exemplary embodiment of the present application.

FIG. 13 is a diagram illustrating an upper blank space and a lower blank space of an original document according to an exemplary embodiment of the present application.

Referring to FIG. 13, the size of the intermediate blank space 4200 according to an exemplary embodiment of the present application may be set based on the page layout 3050 of the original document 3000. For example, the size of the intermediate blank space 4200 may be set to the sum of top margin and bottom margin of pages of the original document 3000.

Figure 14:
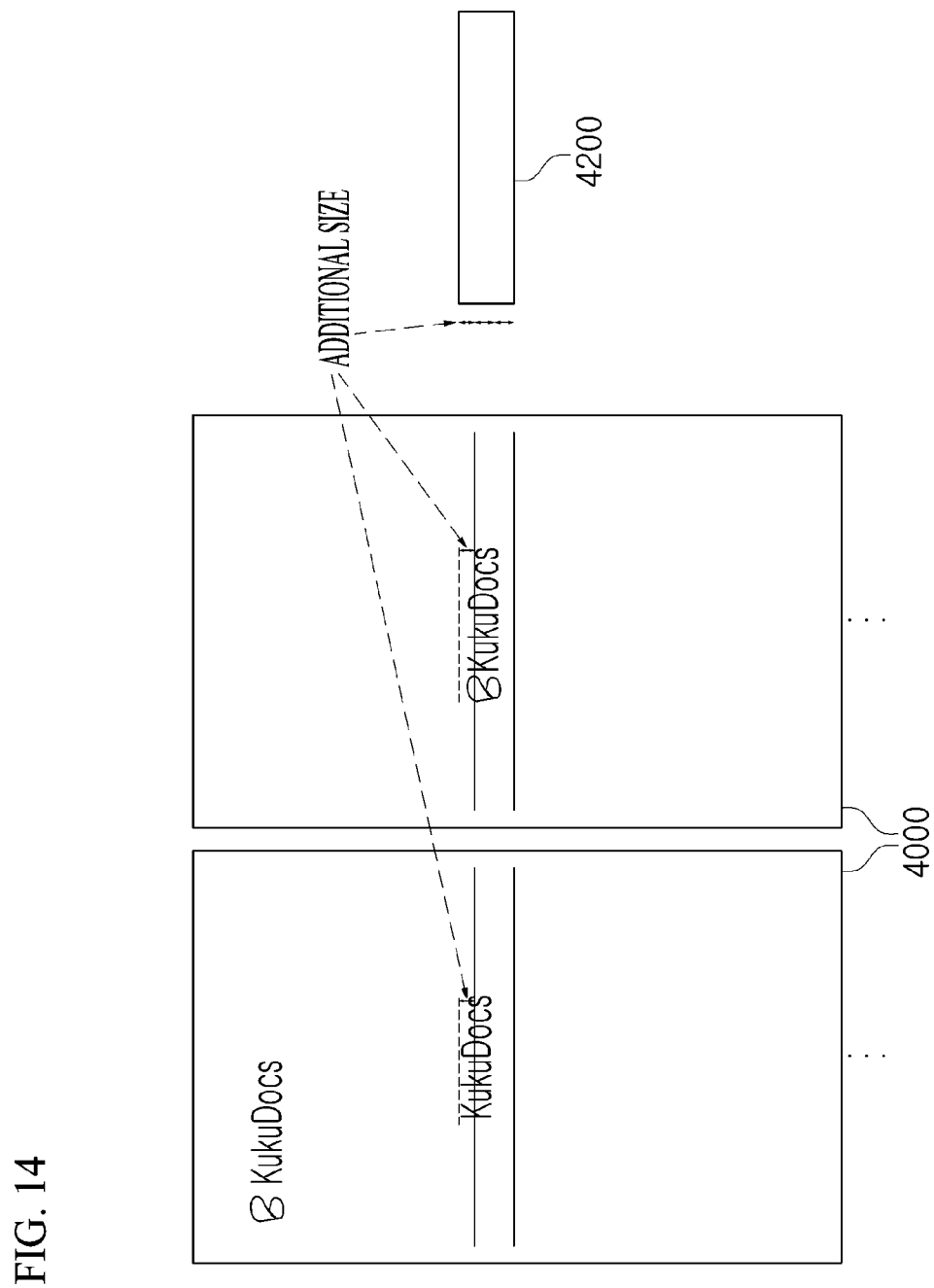
FIG. 14 is a diagram showing content overlapping a separating position of a content layer at an output level according to an exemplary embodiment of the present application.

FIG. 14 is a diagram showing content overlapping a separating position of a content layer at an output level according to an exemplary embodiment of the present application.

Referring to FIG. 14, the size of the intermediate blank space 4200 may be set by adding the size of a content display region extending upward from the separating position 4100 to the sum of sizes of the aforementioned top margin and bottom margin.

Figure 28:
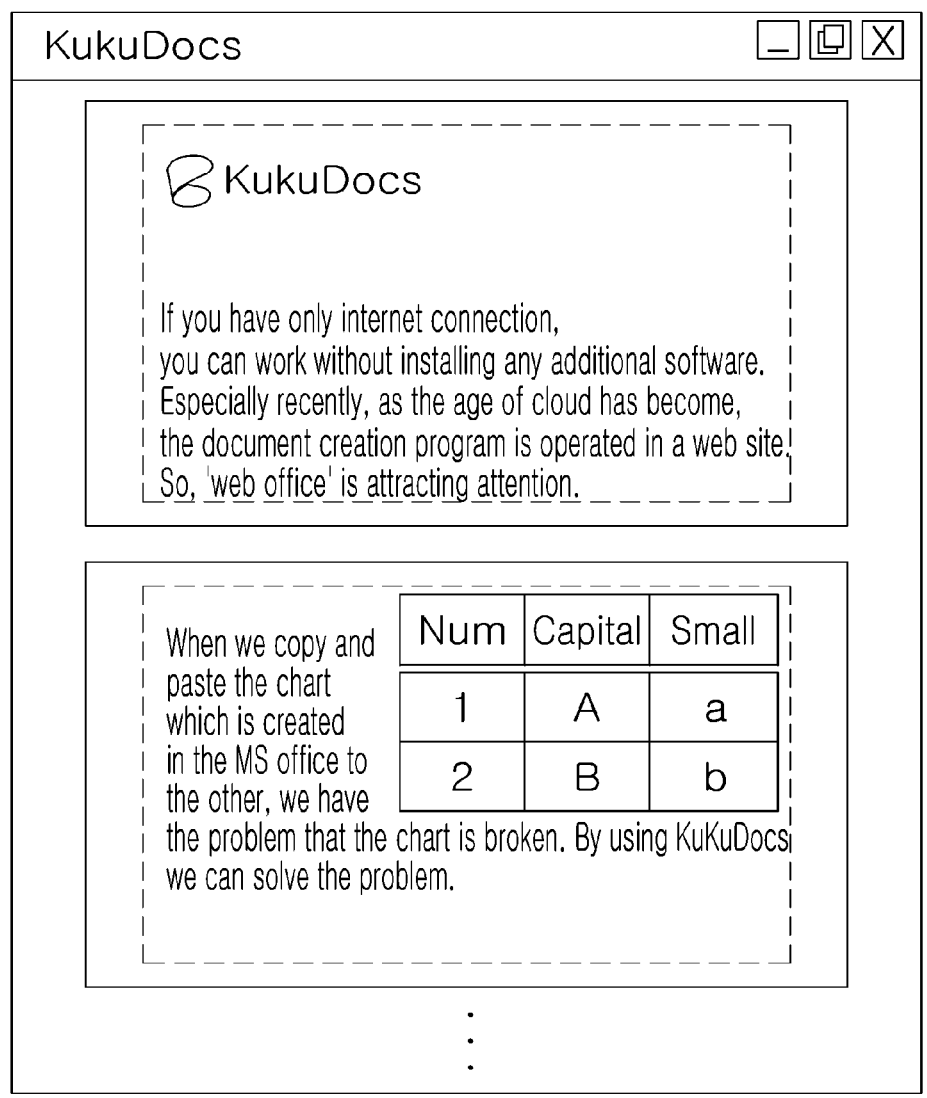
FIG. 28 is a diagram showing an example in which a converted document is output according to an exemplary embodiment of the present application.

Also, referring to FIG. 28, pages of the converted document 6000 which will be described below may be vertically spaced apart. In this case, the size of the intermediate blank space 4200 may be set by further considering the size of the extending content display region.

A method of inserting the intermediate blank space 4200 will be described below.

Figure 15A:
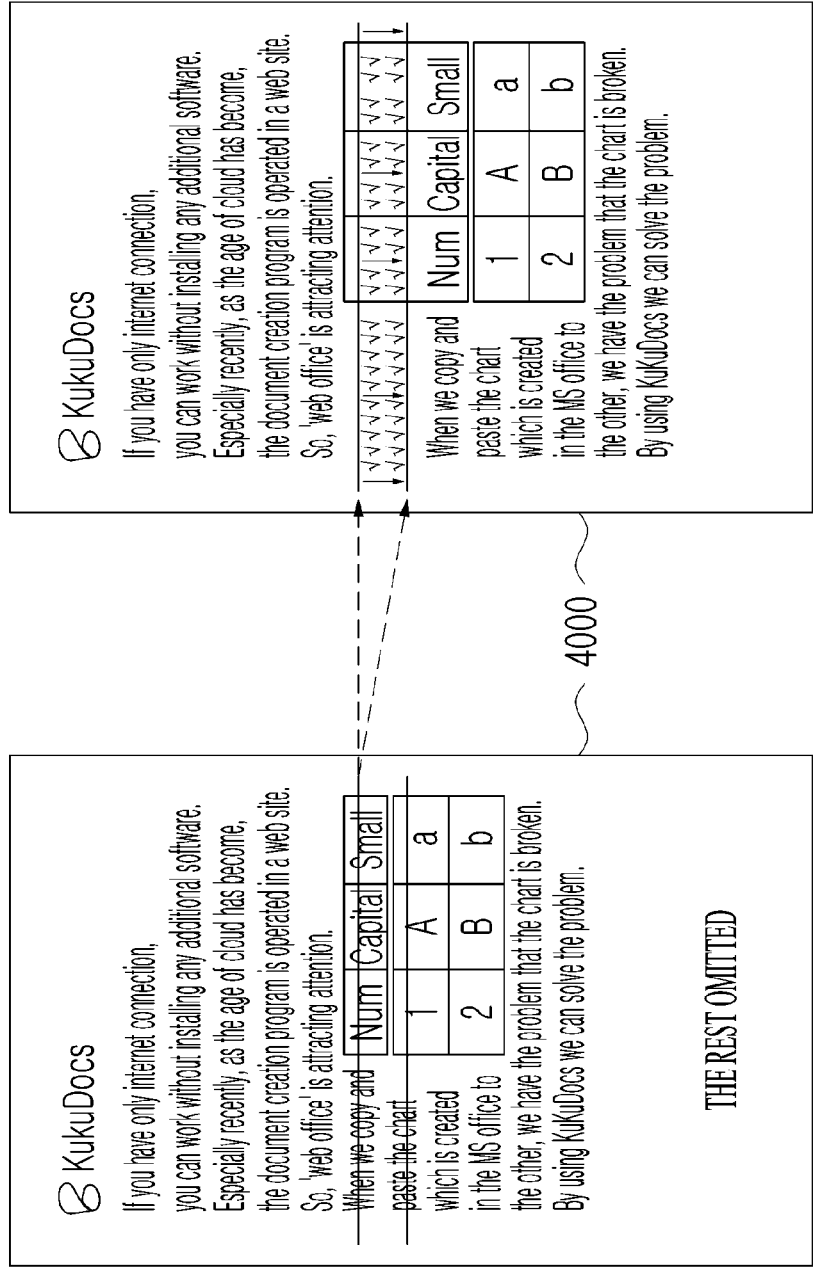
FIG. 15A is diagrams illustrating methods of inserting an intermediate blank space into a separating position according to an exemplary embodiment of the present application.
Figure 15B:
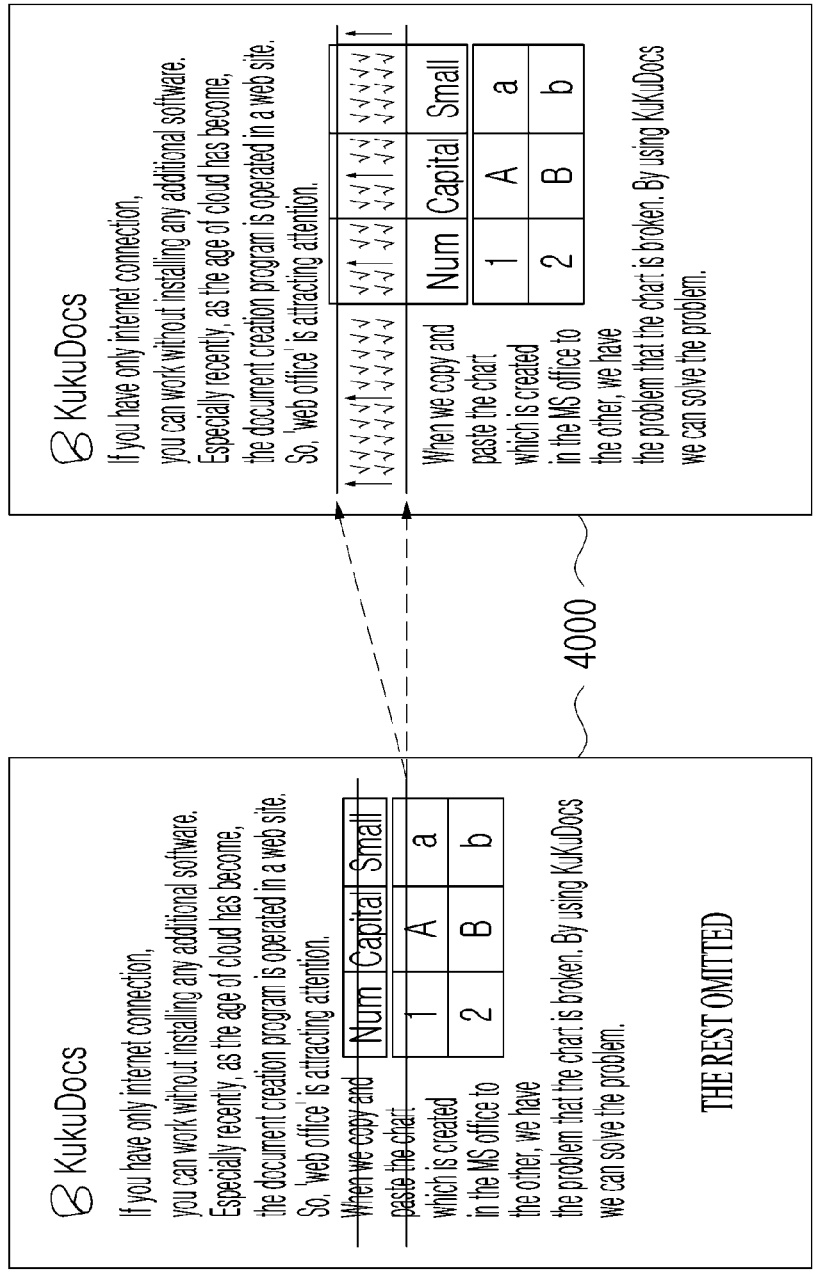
FIG. 15B is diagrams illustrating methods of inserting an intermediate blank space into a separating position according to an exemplary embodiment of the present application.

FIGS. 15A and 15B are diagrams illustrating methods of inserting an intermediate blank space into a separating position according to an exemplary embodiment of the present application.

Referring to FIG. 15A, the intermediate blank space 4200 according to an exemplary embodiment of the present application may be inserted below the separating position 4100, with predetermined size. For example, when the separating position 4100 of the content layer 4000 corresponds to a lower boundary among page boundaries 3100 of the original document 3000, it is possible to make a structural change by inserting the intermediate blank space 4200 into the separating position 4100 downward.

Also, referring to FIG. 15B, the intermediate blank space 4200 may also be inserted above the separating position 4100 with predetermined size.

The mark "✓" shown in FIGS. 15A and 15B according to an exemplary embodiment of the present application may represent raw-level electronic data that can be inserted as an intermediate blank space when the document converting unit 12000 inserts the intermediate blank space at the raw level 3200. Meanwhile, the number of "✓" shown in the drawings has no relation with inserted raw-level electronic data and is only intended for marking in the drawings.

The mark "✓" shown in the following drawings is also intended to represent a case of inserting an intermediate blank space at a raw level.

Meanwhile, the intermediate blank space 4200 may also be inserted into a position adjacent to the separating position 4100 of the content layer 4000 rather than the separating position 4100.

Figure 16:
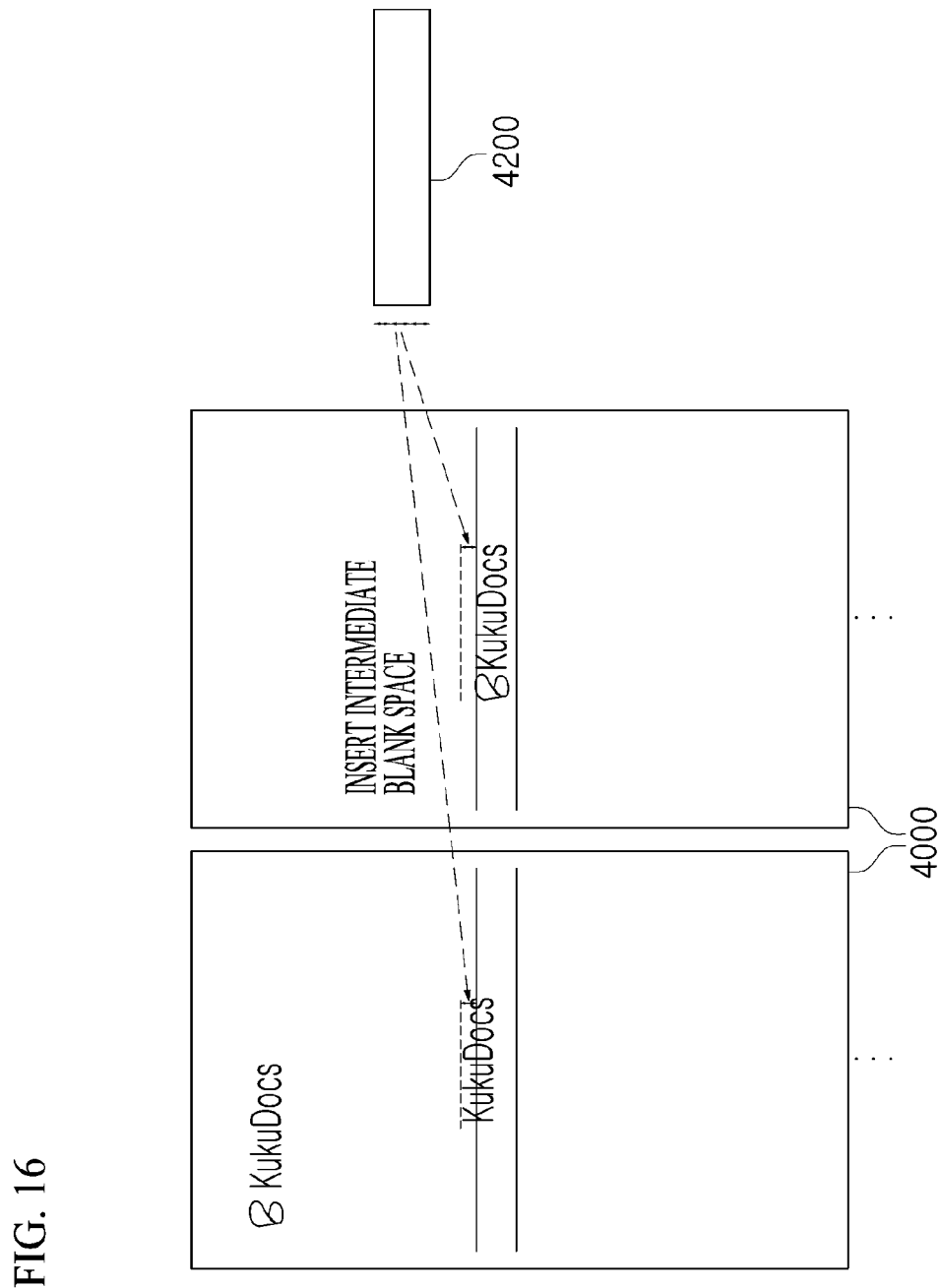
FIG. 16 is a diagram illustrating a case of inserting an intermediate blank space into a position adjacent to a separating position rather than the separating position according to an exemplary embodiment of the present application.

FIG. 16 is a diagram illustrating a case of inserting an intermediate blank space into a position adjacent to a separating position rather than the separating position, according to an exemplary embodiment of the present application.

Referring to FIG. 16, the intermediate blank space 4200 may be inserted immediately above a content display region overlapping the separating position 4100 of the content layer 4000.

Also, when the position of the separating position 4100 corresponds to an upper boundary of a page of the original document 3000, the intermediate blank space 4200 may also be inserted into a position that is above the separating position 4100 by the size of the intermediate blank space 4200.

The above-described operation of inserting the intermediate blank space 4200 into the separating position 4100 may be performed by using various methods according to a kind of electronic data existing at the separating position 4100 of the content layer 4000. The various methods will be described below.

<Text-Form Content>

The document converting unit 12000 according to an exemplary embodiment of the present application can insert the intermediate blank space 4200 such that part of the element data 3210 and/or the text-form content 3310 included in the content layer 4000 can be vertically spaced apart.

Figure 17:
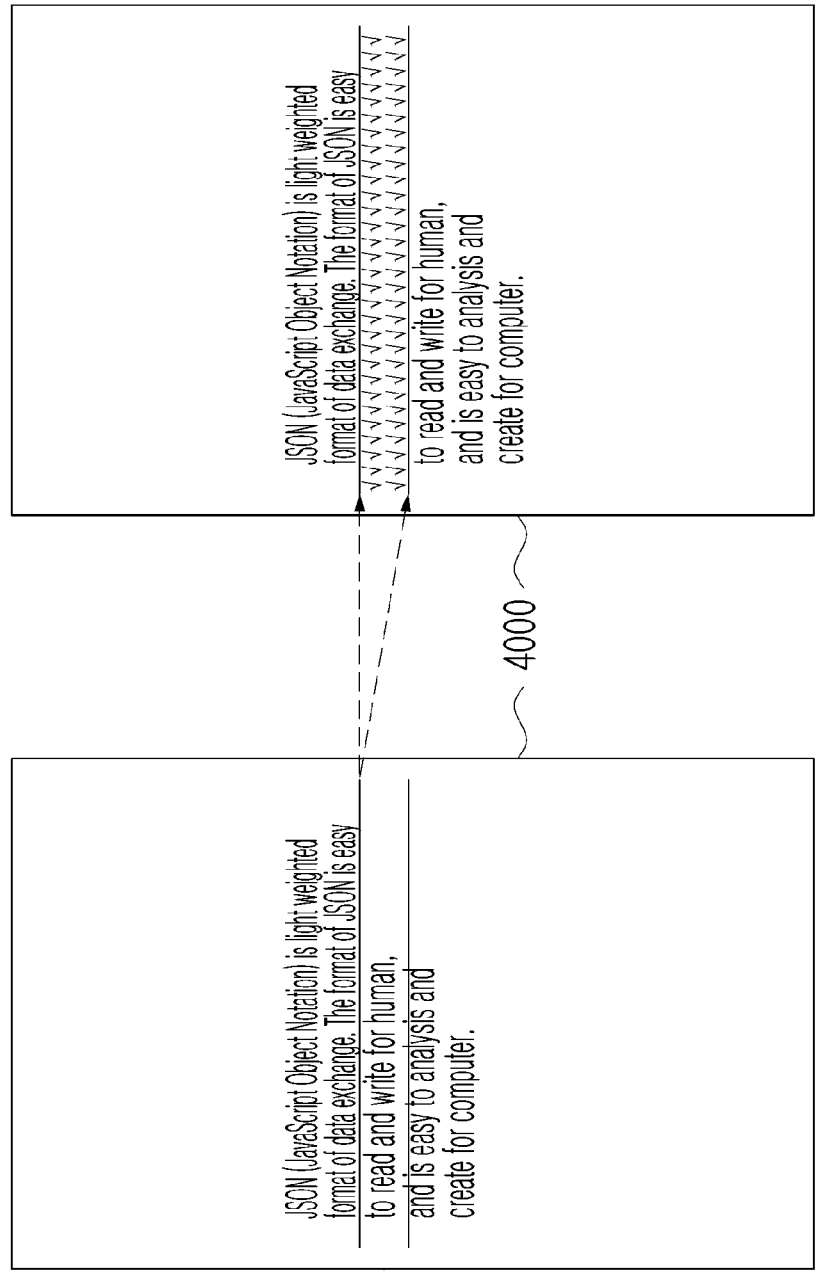
FIG. 17 is a diagram illustrating a process of inserting an intermediate blank space into a separating position of a content layer according to an exemplary embodiment of the present application when element data and/or text-form content exist at the separating position.

FIG. 17 is a diagram illustrating a process of inserting an intermediate blank space into a separating position of a content layer according to an exemplary embodiment of the present application.

Referring to FIG. 17, the document converting unit 12000 according to an exemplary embodiment of the present application may vertically space parts of the element data 3210 and/or the text-form content 3310 apart by inserting the intermediate blank space 4200 into the separating position 4100 of the content layer 4000.

For example, by inserting the intermediate blank space 4200 into the separating position 4100, the document converting unit 12000 may modify the position of the text-form content 3310 to move downward by the size of the intermediate blank space 4200. As a result, parts of the text-form content 3310 can be shown to be vertically spaced apart below the separating position 4100 at the output level 3300. The size of vertically spaced apart space is conformed to a predetermined size of intermediate blank space 4200.

In some cases, element data and/or text content of a content layer may include a separating position. A method of inserting an intermediate blank space in such a case will be described below.

Figure 18:
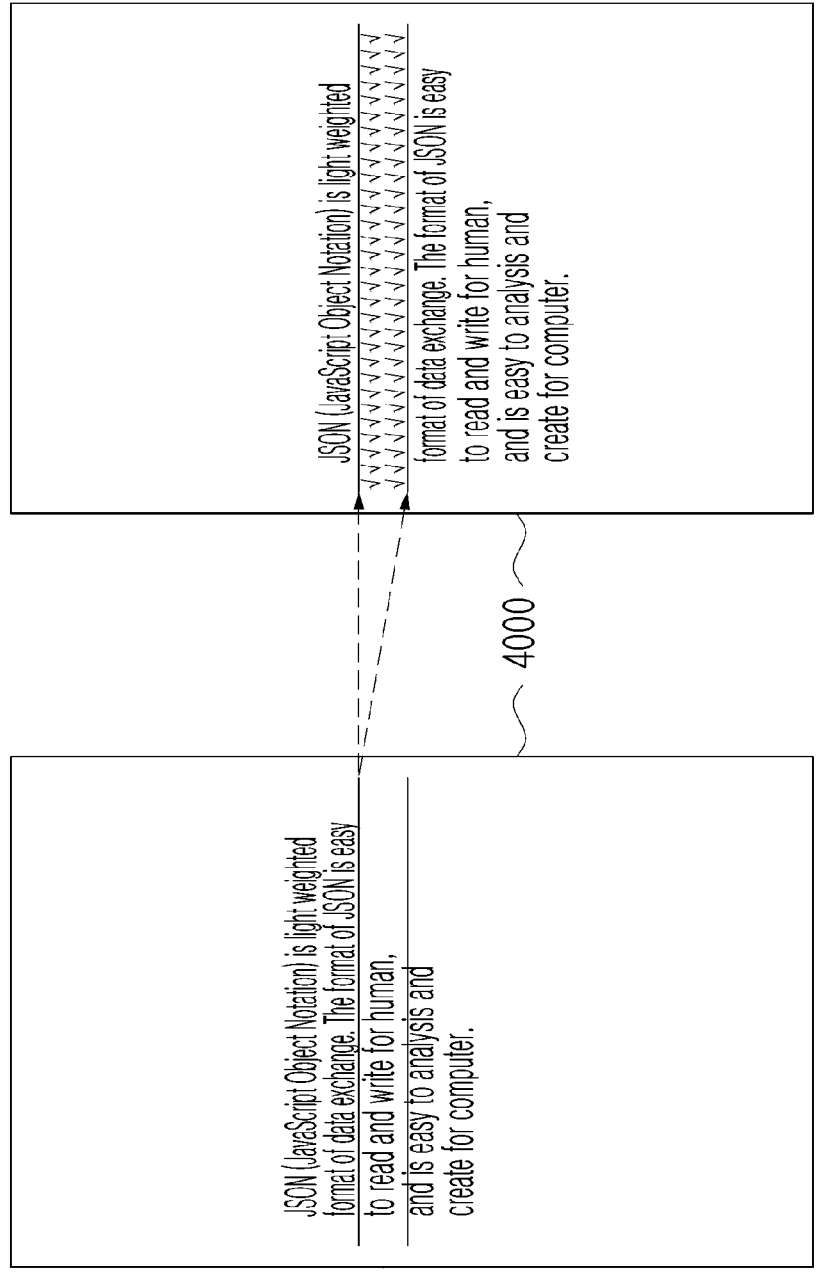
FIG. 18 is a diagram illustrating a process of inserting an intermediate blank space into a separating position according to an exemplary embodiment of the present application when element data and/or text content include the separating position.

FIG. 18 is a diagram illustrating a process of inserting an intermediate blank space into a separating position according to an exemplary embodiment of the present application, when element data and/or text content include the separating position.

Referring to FIG. 18, when the element data 3210 and/or the text-form content 3310 may overlap the separating position 4100 of the content layer 4000, the document converting unit 12000 according to an exemplary embodiment of the present application. In this case, the intermediate blank space 4200 may be inserted immediately above the content display region.

As a result, a part of the text-form content 3310 visually exists below the separating position 4100 by the size of the intermediate blank space 4200 at the output level 3300 of the content layer 4000, such that parts of the text-form content 3310 may be shown to be vertically spaced apart.

<Image-Form Content>

The document converting unit 12000 according to an exemplary embodiment of the present application may insert the intermediate blank space 4200 to visually modify positions of image data and/or the image content 3020 included in the content layer 4000.

Figure 19:
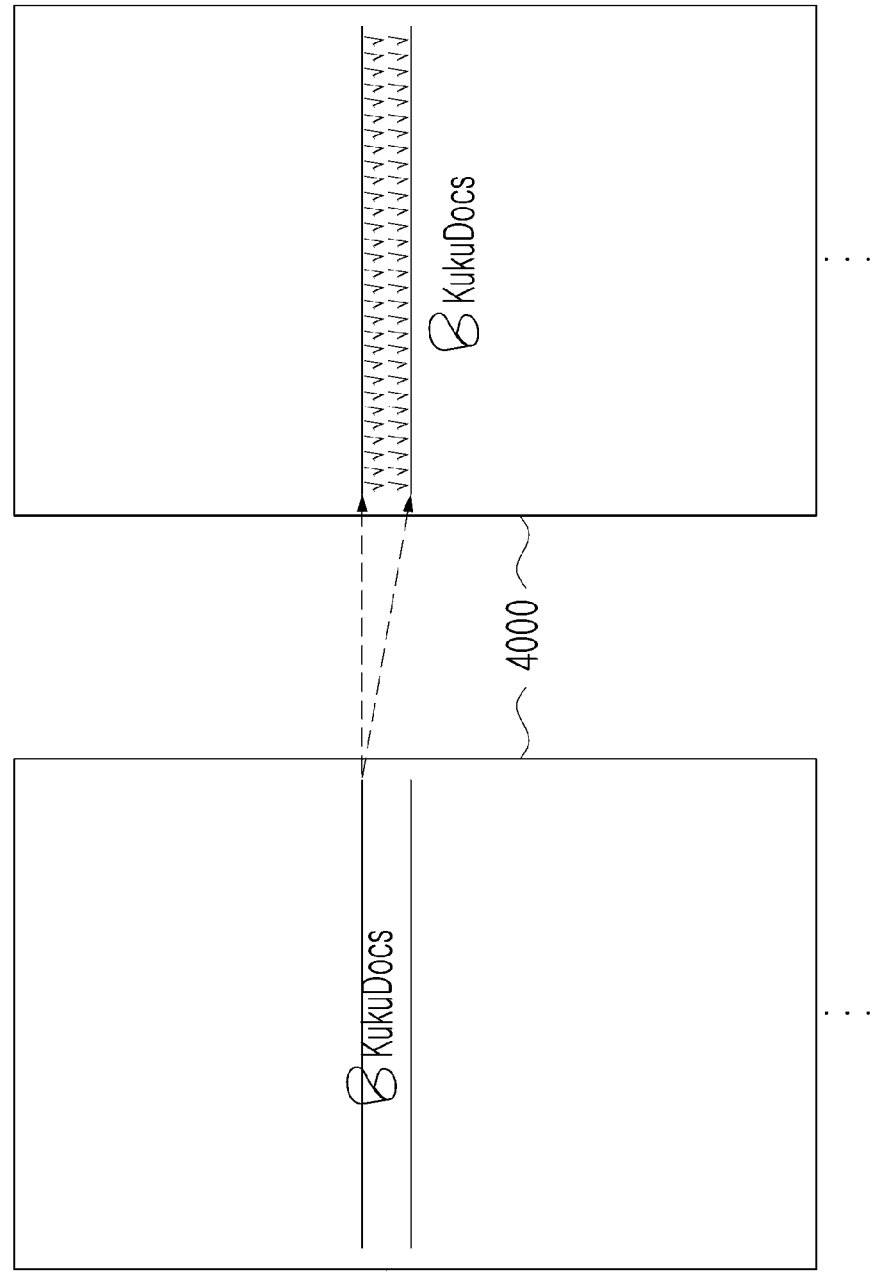
FIG. 19 is a diagram illustrating a process of inserting an intermediate blank space into a separating position of a content layer according to an exemplary embodiment of the present application when image data and/or image-form content include the separating position.

FIG. 19 is a diagram illustrating a process of inserting an intermediate blank space into a separating position of a content layer according to an exemplary embodiment of the present application when image data and/or image-form content include the separating position.

Referring to FIG. 19, image data and/or the image-form content 3320 may overlap the separating position 4100 of the content layer 4000, the document converting unit 12000 according to an exemplary embodiment of the present application. In this case, the intermediate blank space 4200 may be inserted immediately above the content display region, such that the image-form content 3320 may be placed below the inserted intermediate blank space 4200.

Meanwhile, when image data and/or the image-form content 3320 do not include the separating position 4100, the document converting unit 12000 performs an operation according to the above-described general method of inserting the intermediate blank space 4200.

<Table-Form Content>

The document converting unit 12000 according to an exemplary embodiment of the present application may insert the intermediate blank space 4200 to modify structures of table data and/or the table-form content 3330 included in the content layer 4000.

Figure 20:
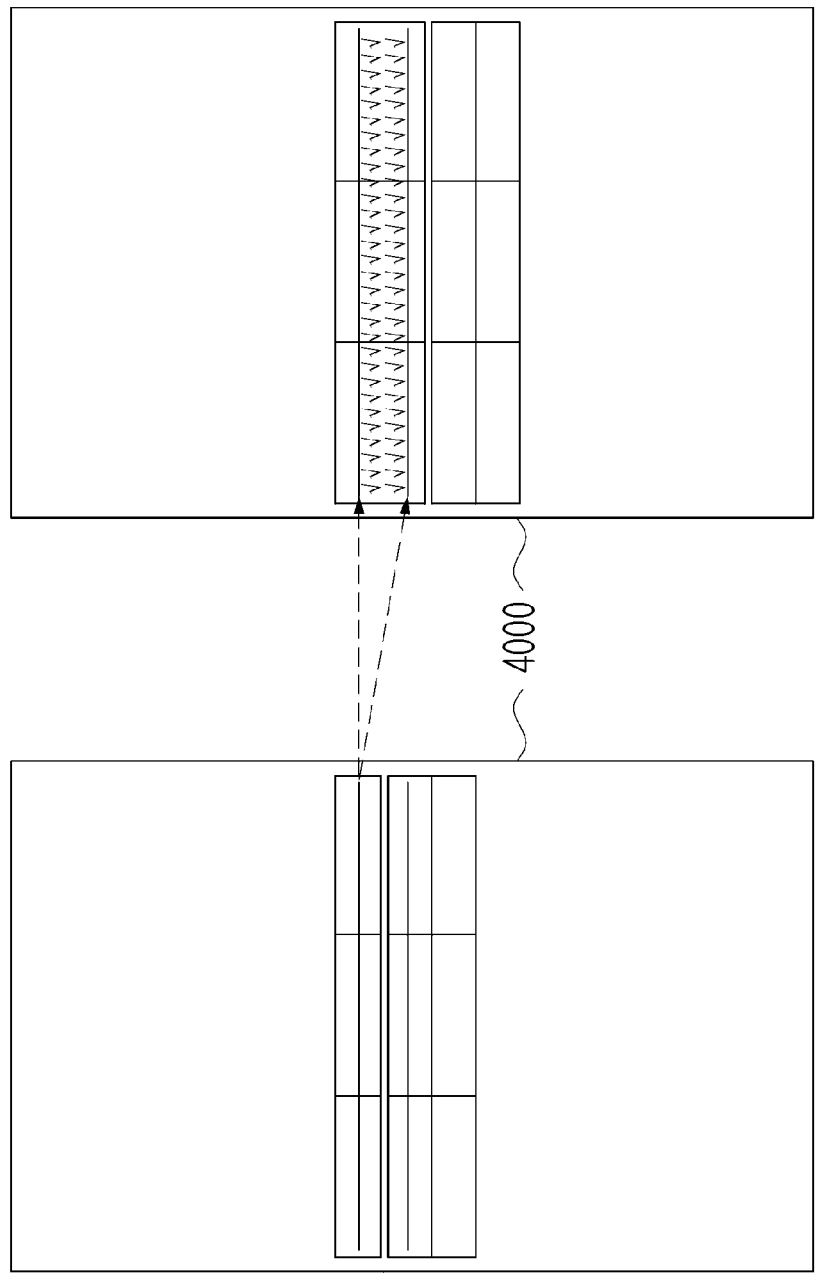
FIG. 20 is a diagram illustrating a process of inserting an intermediate blank space into a separating position of a content layer according to an exemplary embodiment of the present application when table data and/or table-form content exist at the separating position.

FIG. 20 is a diagram illustrating a process of inserting an intermediate blank space into a separating position of a content layer according to an exemplary embodiment of the present application, when table data and/or table-form content exist at the separating position.

Referring to FIG. 20, when table data and/or the table-form content 3330 may overlap the separating position 4100 of the content layer 4000, the document converting unit 12000 according to an exemplary embodiment of the present application. In this case, the intermediate blank space 4200 may be inserted such that the table-form content 3330 may be modified to an extended form. For example, it is possible to modify the table content 3030 to a vertically extended form by inserting the intermediate blank space 4200 into a row including the separating position 4100 among rows of the table content 3030.

Figure 21:
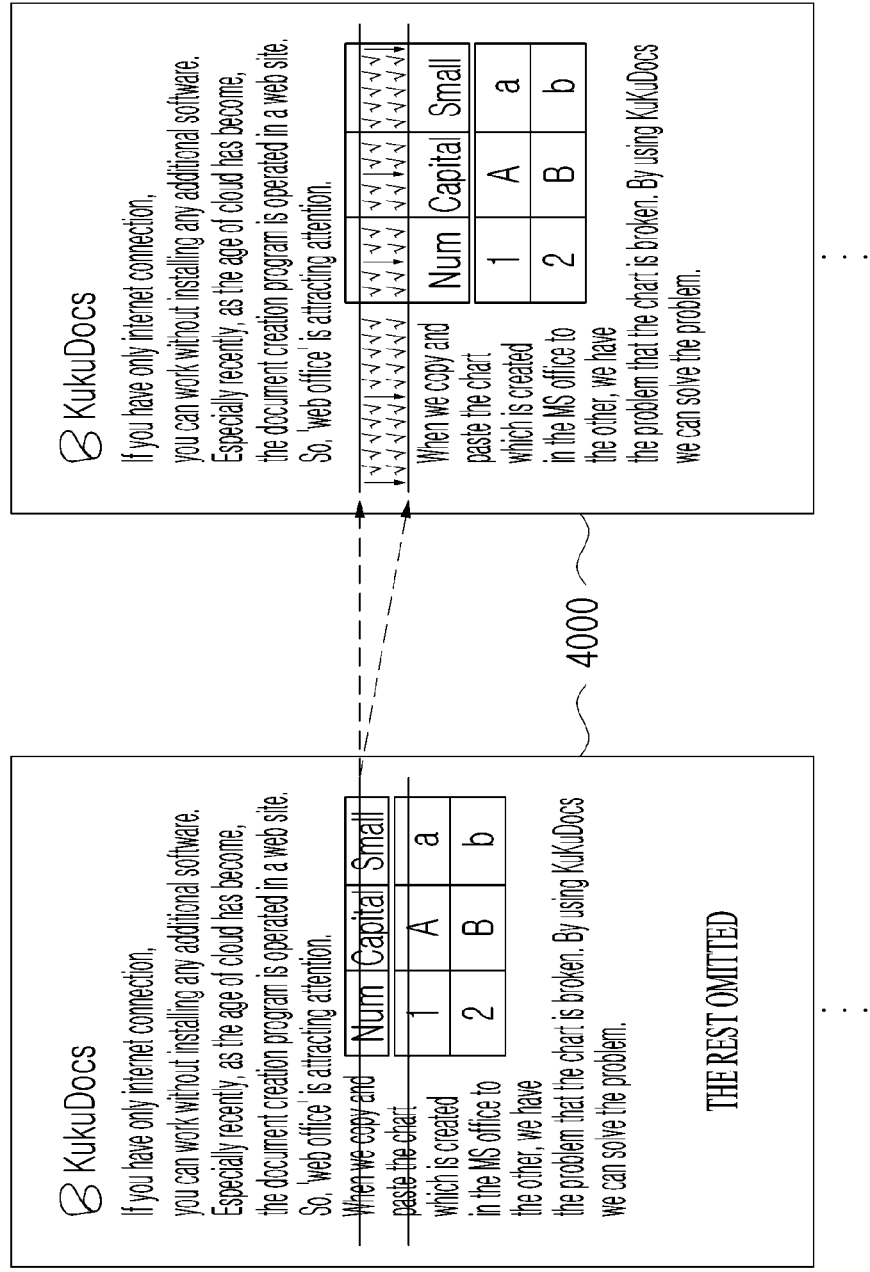
FIG. 21 is a diagram illustrating a process of inserting an intermediate blank space into a row of table data and/or table-form content according to an exemplary embodiment of the present application when electronic data exists in the row of table data and/or the table-form content.

FIG. 21 is a diagram illustrating a process of inserting an intermediate blank space into a row of table data and/or table-form content according to an exemplary embodiment of the present application when electronic data exists in the row of table data and/or the table-form content.

Referring to FIG. 21, when rows of table data and/or table-form content 3330 into which the intermediate blank space 4200 is inserted include electronic data therein, the document converting unit 12000 according to an exemplary embodiment of the present application may place the content below the inserted intermediate blank space 4200.

For example, a structure of the table-form content 3330 may be modified to a form in which the table-form content 3330 is extended. By inserting the intermediate blank space 4200 above the uppermost piece of content among pieces of content in rows, the content in the rows of table-form content 3330 is placed below the inserted intermediate blank space 4200.

A method of inserting the intermediate blank space 4200 into the content layer 4000 is not limited to the above-described method, and other methods may be used.

2.2.2 Operation of Generating Frame Layer

An operation of the document converting unit 12000 generating a frame layer 5000 according to an exemplary embodiment of the present application will be described below. Here, the frame layer 5000 generated by the document converting unit 12000 may be singular or plural in number.

In this specification, the frame layer 5000 can denote a single sheet including the layout data 3220 at the raw level 3200 and/or the page frame content 3340 at the output level 3300 according to the page layout 3050 of the original document 3000.

Figure 22:
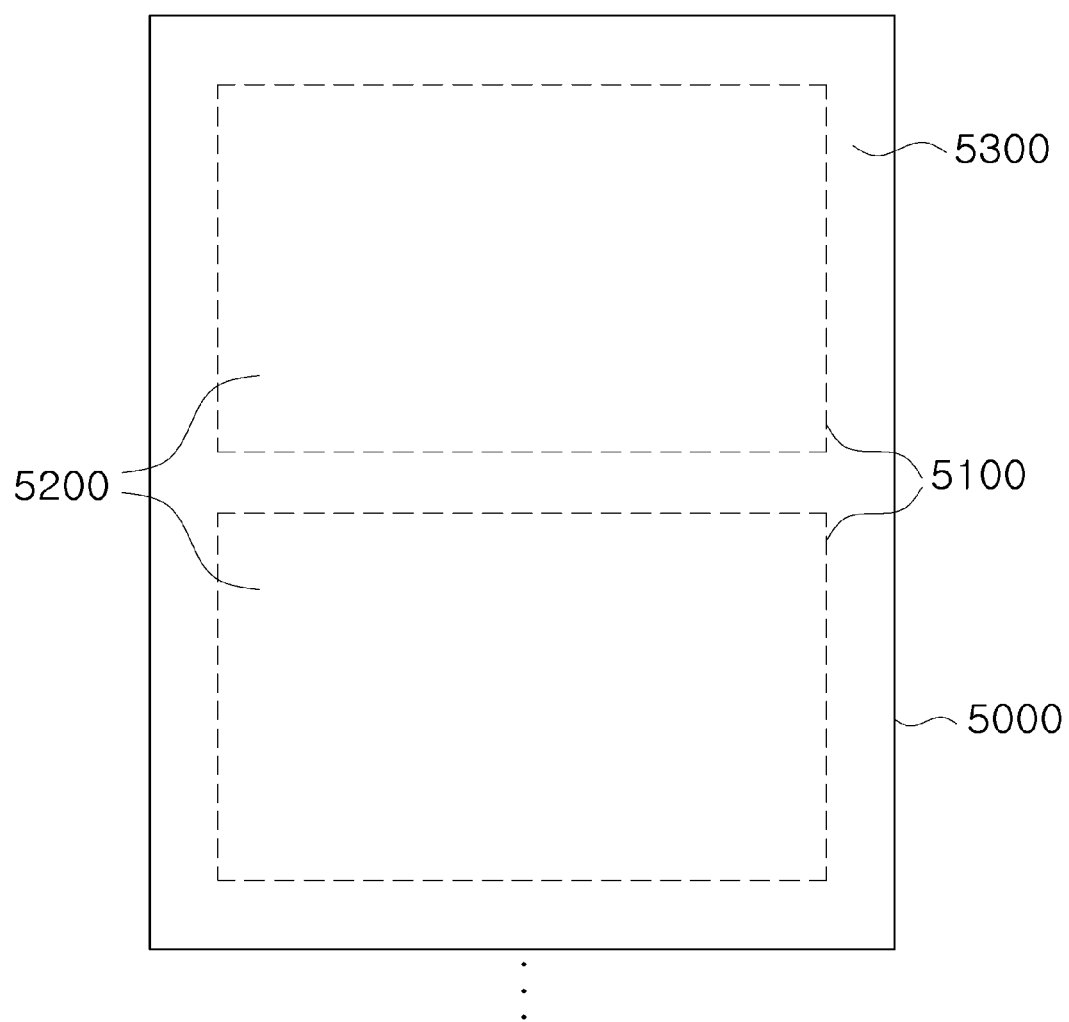
FIG. 22 is a diagram showing a frame layer according to an exemplary embodiment of the present application.

FIG. 22 is a diagram showing a frame layer according to an exemplary embodiment of the present application.

Referring to FIG. 22, an operation of generating the frame layer 5000 according to an exemplary embodiment of the present application may be performed by the document converting unit 12000 extracting information on the page layout 3050 of the file of the original document 3000 and configuring a single sheet.

The operation of generating the frame layer 5000 may be operation that the document converting unit 12000 may extract the information on the page layout 3050 of the original document 3000 and configure the layout data 3220 to have a specific page frame 5100 suited to a page size of the original document 3000 at the raw level 3200. The operation may be operation to have the page content frame 3340 at the output level 3300.

the layout data 3220 and/or the page frame content 3340 may be configured by considering an upper blank space, left and right blank spaces, and a lower blank space according to the page layout 3050 of the original document 3000. For convenience of description, electronic data based on a page layout of the original document 3000 included in the frame layer 5000 is referred to as the page frame 5100 regardless of the raw level 3200 or the output level 3300.

The page frame 5100 according to an exemplary embodiment of the present application may be set based on the electronic data of the original document 3000. In particular, the page frame 5100 may be set based on the page layout 3050 of the original document 3000. For example, size and structure of the page frame 5100 may be set by considering a page size, blank spaces in a page, paper orientation, etc., and the number of page frames 5100 included in the frame layer 5000 may be set based on the number of pages of the original document 3000.

Referring back to FIG. 22, the page frame 5100 according to an exemplary embodiment of the present application may divide the region of the frame layer 5000. For example, the region of the frame layer 5000 may be divided into internal regions 5200 in which the electronic data of the content layer 4000 is visually displayed on the converted document 6000, which will be described below, and an external region 5300 in which the electronic data of the content layer 4000 is not displayed.

Assuming a case where the content layer 4000 is output through the frame layer 5000 at the output level 3300, the internal regions 5200 of the frame layer 5000 may be transparent regions such that the electronic data of the content layer 4000 may be displayed on the converted document 6000. Also, the external region 5300 of the frame layer 5000 may be an opaque region such that the content of the content layer 4000 may be covered.

However, the internal regions 5200 and the external region 5300 of the frame layer 5000 have been described above as transparent and opaque regions, respectively, only for convenience of description, and the internal regions 5200 and the external region 5300 may not be transparent and opaque regions, respectively. In other words, the internal regions 5200 and the external region 5300 of the frame layer 5000 may be in any forms as long as the electronic data of the content layer 4000 may be output through the internal regions 5200 of the frame layer 5000.

Attributes of the frame layer 5000 generated by the document converting unit 12000 will be described in detail below.

2.2.2.1 Shape of Page Frame

The page frames 5100 according to an exemplary embodiment of the present application may serve to divide a region of a single sheet. For example, the region of the frame layer 5000 may be divided into the internal regions 5200 and the external region 5300 by the page frames 5100 included in the frame layer 5000.

Such division of the regions of the page frames 5100 may denote that the page frames 5100 have a specific shape to be distinguishable from other regions.

Figure 23:
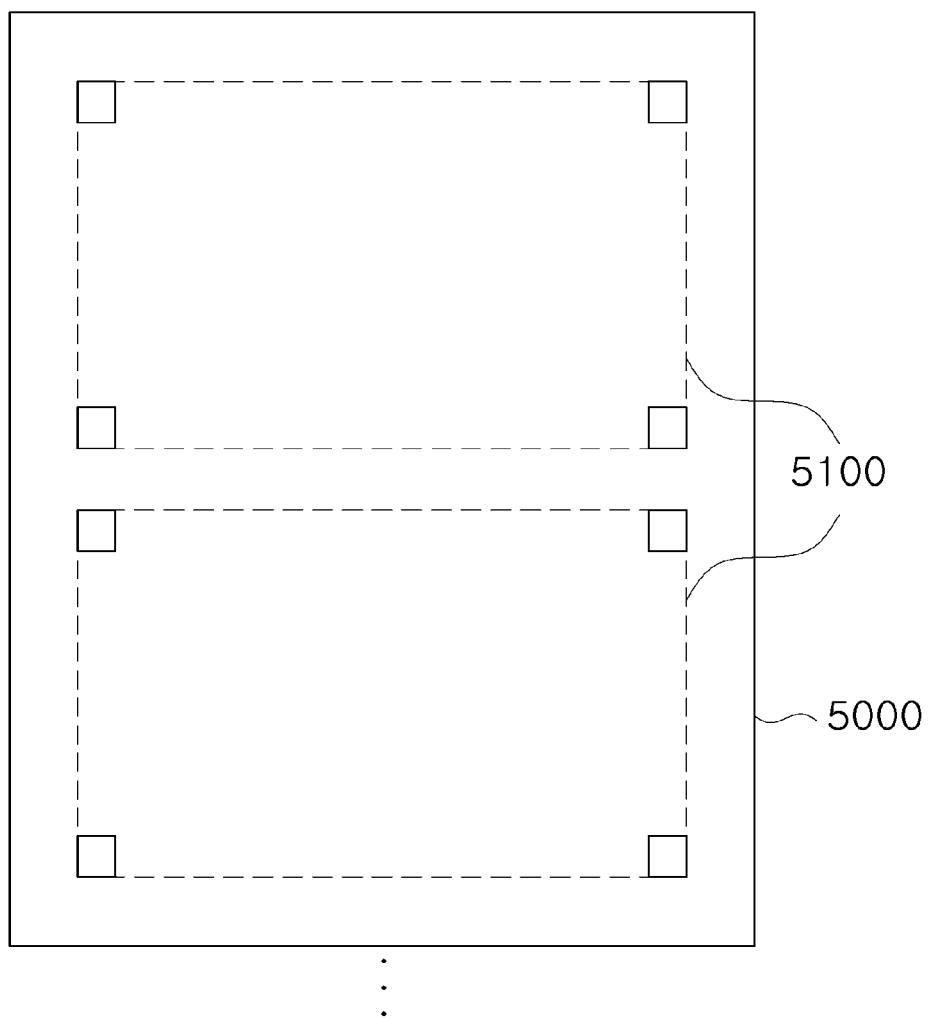
FIG. 23 is a diagram showing a shape of page frames included in a frame layer according to an exemplary embodiment of the present application.

FIG. 23 is a diagram showing a shape of page frames included in a frame layer according to an exemplary embodiment of the present application.

Referring to FIG. 23, the page frames 5100 according to an exemplary embodiment of the present application can have a specific shape.

For example, the page frames 5100 may have specific shapes at corners and in boundaries. The corners of the page frames 5100 can have at least one of a box shape, a cramp iron shape, a circular shape, and transparency, and the boundaries of the page frames 5100 may be at least one of a solid line, a dotted line, and a broken line.

The page frames 5100 may be generated to have a shape corresponding to the page layout 3050 of the original document 3000. However, the page frames 5100 may have a shape that does not correspond to the page layout 3050 of the original document 3000. For example, a shape of the page frames 5100 may be selected according to a document user's preference, and the shape of the page frames 5100 may not correspond to the page layout 3050 of the original document 3000.

2.2.2.2 Inclusion of Additional Information

The frame layer 5000 including predetermined additional information will be described below.

The frame layer 5000 according to an exemplary embodiment of the present application may include additional information. When there are plurality of frame layers 5000, the respective frame layers 5000 may include different pieces of additional information.

Such additional information may be preset electronic data, such as the electronic data included in the original document 3000, bibliographic information of the frame layer 5000, etc. but may also be electronic data input by a user. In other words, the additional data included in the frame layer 5000 may be any electronic data that may be input.

Specifically, the additional information included in the frame layer 5000 can be electronic data, such as introduction, conclusion, page numbers, time, or so on.

Figure 24:
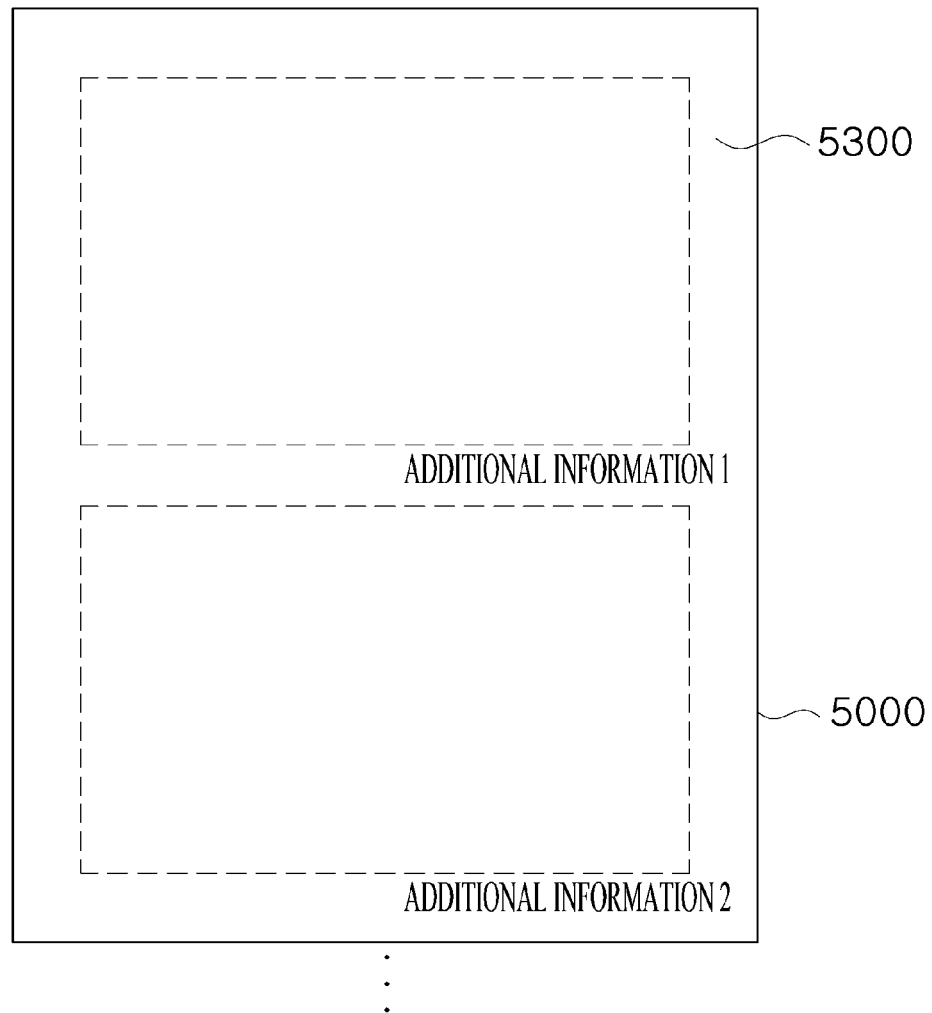
FIG. 24 is a diagram showing that a frame layer may include additional information in an external region according to an exemplary embodiment of the present application.

Referring to FIG. 24, the frame layer 5000 according to an exemplary embodiment of the present application may include additional information in the external region 5300. There is no limitation on a region including additional information, but additional information may be preferably included in the external region 5300 of the frame layer 5000.

Also, there may be no limitation on position of the external region 5300 in the frame layer 5000 at which additional information can be placed. For example, a position in the external region 5300 at which additional information is displayed may be a preset position but may also be a position according to selection of a user. Specifically, additional information may be placed in a space, such as a space between page frames 5100, preset by the electronic document converting system 10000, but may also be placed at another position, such as on the left or right of the page frames 5100, according to selection of a user.

Such additional information of the external region 5300 of the page frames 5100 may be output on the converted document 6000, which will be described below, together with the electronic data of the content layer 4000 presented through the internal regions 5200 of the frame layer 5000 described above.

2.2.3 Operation of Generating Converted Document

An operation of the document converting unit 12000 generating the converted document 6000 will be described below.

The document converting unit 12000 according to an exemplary embodiment of the present application may generate the converted document 6000. For example, the converted document 6000 may be generated by using the content layer 4000 and/or the frame layer 5000 described above.

The converted document 6000 may be generated by, for example, a method of combining electronic data included in the content layer 4000 and/or the frame layer 5000 at the raw level 3200, a method of combining visual data of the content layer 4000 and/or the frame layer 5000 output at the output level 3300, and so on.

In other words, an operating method of the document converting unit 12000 may be any method of generating the converted document 6000 having visual data corresponding to visual expressions of the original document 3000 by combining the content layer 4000 and/or the frame layer 5000.

Detailed examples of combining the content layer 4000 and the frame layer 5000 will be described with examples of structures of the content layer 4000 and/or the frame layer 5000.

Figure 25:
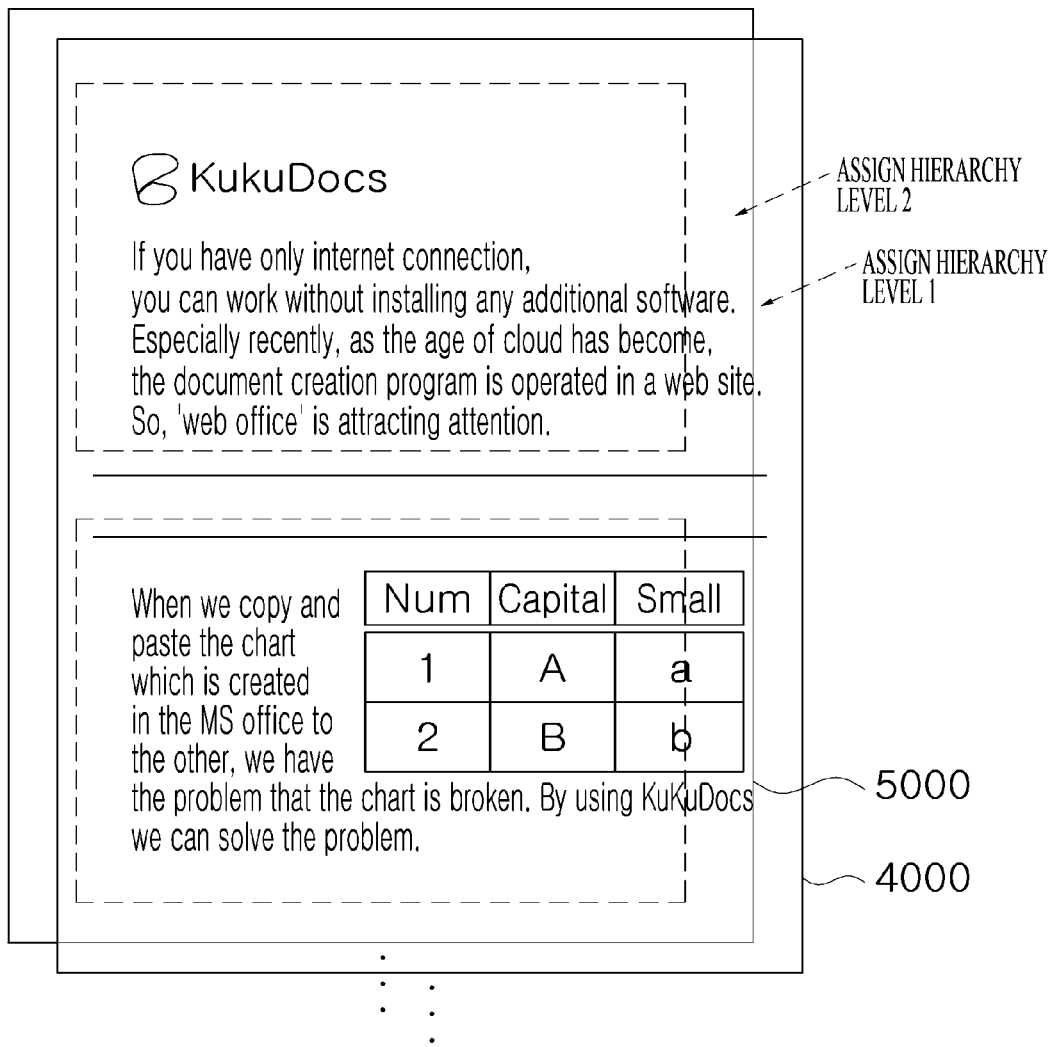
FIG. 25 is a structural diagram of a converted document according to an exemplary embodiment of the present application.

FIG. 25 is a structural diagram of a converted document according to an exemplary embodiment of the present application.

Referring to FIG. 25, the converted document 6000 may be generated by combining the content layer 4000 including content and the frame layer 5000 into a structure in which the two layers overlap.

Here, the overlap may denote generating the converted document 6000 by combining raw-level electronic data other than hierarchy-related data when the raw-level electronic data of the content layer 4000 and/or the frame layer 5000 is given different pieces of the hierarchy-related data at the raw level 3200.

Alternatively, the overlap may denote generating the converted document 6000 by combining the content layer 4000 and/or the frame layer 5000 at the output level 3300 when the content layer 4000 and/or the frame layer 5000 are given hierarchy attributes at the output level 3300 and have different hierarchies.

Meanwhile, the content layer 4000 and/or the frame layer 5000 constituting the converted document 6000 according to an exemplary embodiment of the present application may have priorities. Here, the priorities may be set based on the hierarchy-related data.

The priorities may be values that are preset according to the importance of electronic data included in respective layers or may be values set according to an input of a user. In other words, priorities of layers constituting the converted document 6000 may be any values that may be compared between the layers.

2.3 Converted Document Output Unit

In this specification, it has been described above that the converted document 6000 may include the content layer 4000 and/or the frame layer 5000. The converted document 6000 may have an output form that is visually the same as the original document 3000, and the converted document 6000 output from the electronic document converting system 10000 will be described below.

Figure 26:
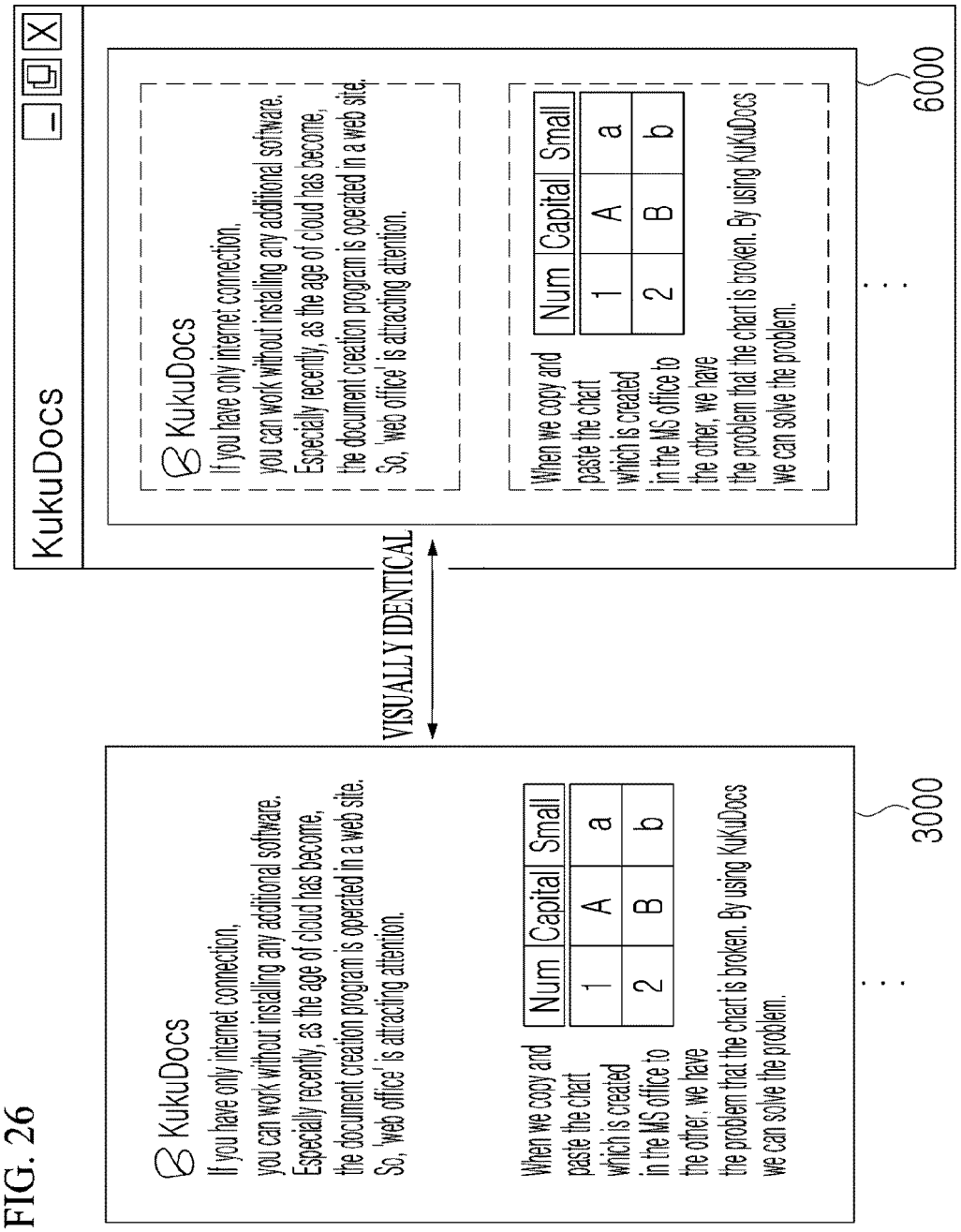
FIG. 26 is a diagram showing an original document and a converted document according to an exemplary embodiment of the present application.

FIG. 26 is a diagram showing an original document and a converted document according to an exemplary embodiment of the present application.

Referring to FIG. 26, visually the same form can denote that the converted document 6000 has substantially the same structure as the original document 3000. For example, visually the same form may denote that, when the output original document 3000 and the converted document 6000 at the output level 3300 are compared, the same content is output, the same or similar forms are applied, and there is the same page separation. Therefore, even when there is a slight difference in the configuration of content, documents that are the same or similar in content, form, and/or page separation may be referred to as visually the same.

The converted document output unit 13000 according to an exemplary embodiment of the present application may output the converted document 6000 described above. Specifically, the converted document output unit 13000 may perform an operation of outputting the converted document 6000 to have the same visual form as the original document.

Figure 27:
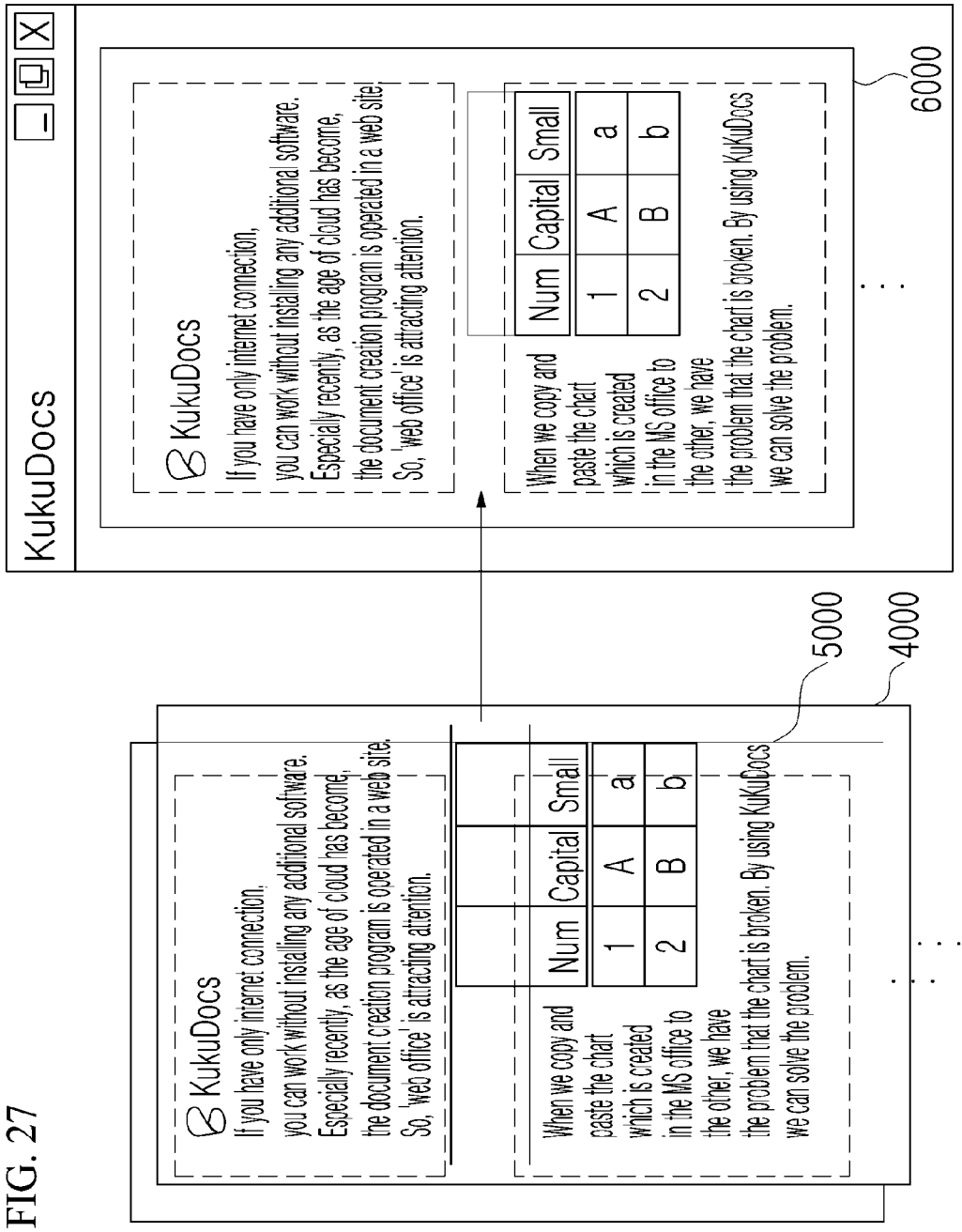
FIG. 27 is a diagram showing a converted document output according to an exemplary embodiment of the present application.

FIG. 27 is a diagram showing a converted document output according to an exemplary embodiment of the present application.

Referring to FIG. 27, the converted document 6000 according to an exemplary embodiment of the present application may be output through an output portion of the system 10000 including the converted document output unit 13000 and may be output through a web application provided by a web browser, an interface provided by the system, etc. according to a type of the system.

Also, referring to FIG. 27, the converted document output unit 13000 can output a configuration of the converted document 6000 based on an overlap attribute.

Outputting a configuration of the converted document 6000 based on an overlap attribute according to an exemplary embodiment of the present application may denote outputting the frame layer 5000 including the opaque external region 5300 and the transparent internal regions 5200 in connection with the content of the content layer 4000.

In other words, the electronic data of the content layer 4000 may be output in regions of the converted document 6000 corresponding to the internal regions 5200 of the frame layer 5000. The overlap attribute may be used in any way in which the converted document 6000 is output to provide the same view as the original document 3000 when the converted document 6000 has pages visually divided according to page frames 5100 of the frame layer 5000.

Therefore, the converted document output unit 13000 according to an exemplary embodiment of the present application may process the content of the content layer 4000 corresponding to the external region 5300 and the internal regions 5200 in a data form or just visually according to the overlap attribute and output the converted document 6000.

Meanwhile, the converted document output unit 13000 may provide a predetermined function to a user separately from output of the converted document 6000. For example, the converted document output unit 13000 may provide predetermined functions to a user to facilitate use of the converted document 6000.

Also, the converted document 6000 may be output in any form that may provide a user with visually the same feeling as the original document 3000. For example, as shown in FIG. 28, the converted document 6000 may be output in a form in which visually divided pages are vertically spaced apart. A gap between the visually divided pages of the converted document 6000 may be rendered in the background color of an application and/or an interface and output.

2.3.1 Order of Priority

The document converting unit 12000 according to an exemplary embodiment of the present application may output the content layer 4000 and/or the frame layer 5000 of the converted document 6000 described above in order of priority.

For example, according to the order of priority of the frame layer 5000 and/or the content layer 4000 included in the converted document 6000, the converted document output unit 13000 may switch output methods of the converted document 6000.

As an example, when there are a plurality of frame layers 5000 and/or content layers 4000, the document converting unit 12000 may output the converted document 6000 by using an overlap attribute between a frame layer 5000 and/or a content layer 4000 having priorities corresponding to each other.

Alternatively, when there are a plurality of frame layers 5000 and a single content layer 4000, the content layer 4000 may be output in order of priority of the plurality of frame layers 5000.

In addition to these methods, various output methods may also be used according to the order of priority of elements of the converted document 6000.

Here, the output method according to the order of priority may be preset in the system 10000 or selected by a user.

3. Method of Converting Electronic Document

Figure 29:
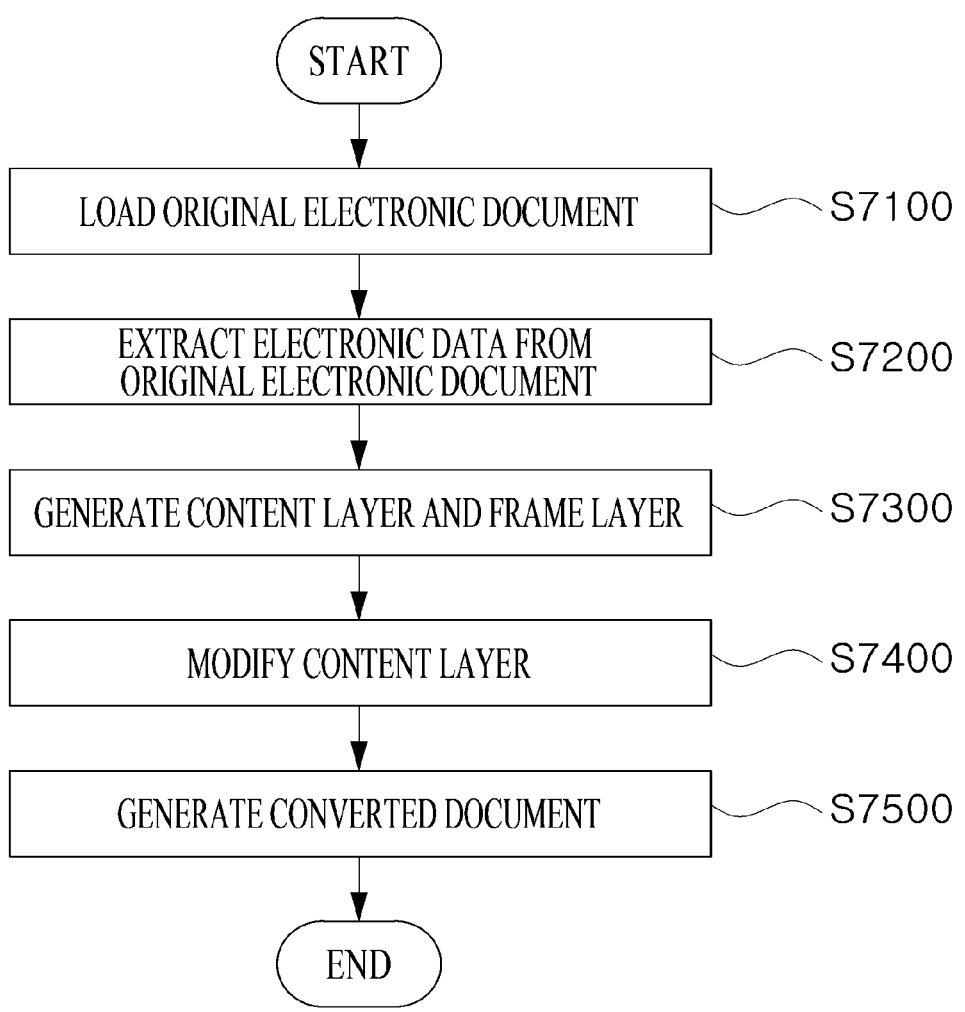
FIG. 29 is a flowchart illustrating a method of converting an electronic document according to an exemplary embodiment of the present application.

FIG. 29 is a flowchart illustrating a method S7000 of converting an electronic document according to an exemplary embodiment of the present application.

Referring to FIG. 29, the method S7000 of converting an electronic document according to an exemplary embodiment of the present application may include an operation S7100 of loading an original document, an operation S7200 of extracting electronic data of the original document, an operation S7300 of generating a content layer and a frame layer, an operation S7400 of correcting the content layer, and an operation S7500 of generating a converted document.

In the exemplary embodiment of the present application, operation S7100 to operation S7500 may be simultaneously performed, or any one operation may be performed before another operation. While all of the operation S7100 to operation S7500 may be performed, it is not necessary that all operations be performed and at least one of operation S7100 to operation S7500 may be only performed.

In operation S7100 for loading an original document, the electronic document converting system 10000 may load the original document 3000. In some cases, the original document 3000 may load a file of the original document 3000 stored in an external device connected to the electronic document converting system 10000.

In operation S7200 for extracting electronic data of the original document, the electronic document converting system 10000 may extract electronic data from the original document 3000. The electronic data may be extracted and then converted through a process of matching the electronic data to electronic data that may be used at a raw level of a single sheet.

In operation S7300 for generating a content layer and a frame layer, the electronic document converting system 10000 may generate the content layer 4000 and the frame layer 5000 by using the electronic data extracted from the original document 3000.

Also, a plurality of frame layers 5000 may be generated according to a user input, and order of priority may be set for the plurality of frame layers 5000.

In operation S7400 for correcting the content layer, the electronic document converting system 10000 may detect the separating position 4100 of the content layer 4000 by using layout information and modify a structure of the content layer 4000 by inserting the intermediate blank space 4200.

In operation S7500 for generating a converted document, the electronic document converting system 10000 may generate a converted document by using the content layer 4000 and the frame layer 5000 and output the converted document through an interface provided by the electronic document converting system 10000.

In the above-described method according to an exemplary embodiment of the present application, operations constituting the exemplary embodiment are not indispensable and thus may be selectively included in the exemplary embodiment. The operations constituting the exemplary embodiment are not required to be performed in the described order, and an operation described later may be performed ahead of an operation described first. Also, while the exemplary embodiment is implemented, any one operation may be repeatedly performed.

According to exemplary embodiments of the present application, an electronic document is converted into a web-compatible format provided as a single sheet and thus may be rapidly output for viewing.

According to exemplary embodiments of the present application, by superimposing a frame layer for distinguishing between pages in a content layer in which content is arranged such that the content layer corresponds to an original document, it is possible to acquire an electronic document of a web-compatible format that is a single sheet having substantially the same visual format as the original document and thus is viewed with convenience.

Effects of the present application are not limited to those described above, and other effects that are not mentioned above may be clearly understood by those of ordinary skill in the art from the above descriptions and appended drawings.

It should be apparent to those skilled in the art that various modifications may be made to the above-described exemplary embodiments of the present application without departing from the spirit or scope of the application. Thus, it is intended that the present application covers all such modifications, provided they come within the scope of the appended claims and their equivalents.

What is claimed is:

1. A method of converting a document, the method comprising:
loading a document file with respect to an original document generated through a word processing program on a local device, the generated original document having a plurality of pages, wherein each of the plurality of the pages included in the original document has an identical page layout;

extracting content information about original content of the original document and layout information including the page layout of the original document from the document file;

wherein the layout information includes a data which is related to a page size and a page blank space of the original document, the page blank space having at least one of a top margin and a bottom margin of the original document, generating a content layer as a single sheet based on the content information, wherein content of the content layer described in the single sheet corresponds to the original content of the original document described in the plurality of the pages, changing the content layer based on the layout information, the changed content layer having an intermediate blank space which is inserted into a separating position of the content of the content layer, the separating position corresponding to a page boundary of the original document which is determined by the page layout of the original document, wherein a size of the intermediate blank space is determined based on at least one of the top margin and the bottom margin;

generating a frame layer including a plurality of page frame images based on the layout information, wherein a number of the plurality of the page frame images is identical to a number of the plurality of the pages of the original document, the plurality of the page frame images have an identical size, and each of the plurality of the page frame images has a page frame boundary; and generating a converted document by combining the content layer and the frame layer, wherein the content layer is provided as the single sheet and the frame layer is overlaid on the single sheet so that the converted document being provided as the single sheet electronically is visually represented as having the plurality of the pages.

2. The method of claim 1, wherein the generating of the content layer includes integrating all of the original content described in the plurality of the pages.

3. The method of claim 1, wherein a number of the plurality of the pages of the converted document as visually represented is identical to the number of the plurality of the pages of the original document.

4. The method of claim 1, wherein the changing of the intermediate blank space includes determining the separating position based on layout information, the layout information including page size information and blank space information.

5. The method of claim 1, wherein the changing of the intermediate blank space includes setting a size of the intermediate blank space based on the blank space information in the layout information.

6. The method of claim 3, wherein the changing of the intermediate blank space includes setting the size of the intermediate blank space by additionally considering a distance between the separating position and an upper end of the content when a display region of the content on the single sheet includes the separating position.

7. The method of claim 3, wherein the changing of the intermediate blank space includes setting the size of the intermediate blank space by additionally considering a page gap of the converted document set in advance.

8. The method of claim 5, wherein the changing of the intermediate blank space includes setting the size of the intermediate blank space by summing an top margin and a bottom margin of the original document according to the blank space information and the page gap.

9. The method of claim 6, wherein the changing of the intermediate blank space includes setting the size of the intermediate blank space by additionally summing a distance between the separating position and an upper end of the content when a display region of the content on the content layer includes the separating position.

10. The method of claim 1, wherein the changing of the intermediate blank space includes inserting the intermediate blank space between upper text and text of the content other than the upper text when content in a text paragraph form includes the separating position, upper text being above the separating position.

11. The method of claim 1, wherein the changing of the intermediate blank space includes inserting the intermediate blank space above a text line when the separating position belongs to a display region of content of the text line or the content of the text line is right below the separating position.

12. The method of claim 1, wherein the changing of the intermediate blank space includes inserting the intermediate blank space above an image, when the separating position belongs to a display region of content of the image or the content of the image is right below the separating position.

13. The method of claim 1, wherein the changing of the intermediate blank space includes inserting the intermediate blank space into a row of a table to which the separating position belongs, when the separating position belongs to a display region of content of the table.

14. The method of claim 11, wherein the changing of the intermediate blank space includes inserting the intermediate blank space into an upper end of the content included in the row, when content is included in the row into which the intermediate blank space is inserted.

15. The method of claim 1, wherein the content information includes information about the original content of the original document and information about a content format of the original document.

16. The method of claim 1, wherein a size of the single sheet of the content layer and a size of the single sheet of the frame layer are set based on the layout information.

17. The method of claim 13, wherein the content of the content layer is arranged in a single line on the content layer based on the content information.

18. The method of claim 1, wherein the frame layer includes internal regions, and
the internal regions are conformed to regions placed the contents of the converted document.

19. The method of claim 16, wherein the frame layer further includes an external region, and
the external region includes at least one piece of additional information about the converted document and is a region conformed to regions placed the additional information of the converted document.

20. The method of claim 17, wherein the additional information is at least one of introduction, conclusion, page numbers, and time.

21. The method of claim 17, wherein the page frame boundaries included in the each of the plurality of the frame images separate the internal regions from the external region of the frame layer.

22. The method of claim 19, wherein the page frame boundaries included in the each of the plurality of the frame images have separating shape between the internal regions and the external region of the frame layer.

23. The method of claim 20, wherein corners of the page frame boundaries included in the each of the plurality of the frame images have at least one of a box shape, a cramp iron shape, a circular shape, and transparency, and
the page frame boundaries included in the each of the plurality of the frame images are at least one of a solid line, a broken line, and a dot-and-dash line.

24. The method of claim 1, further comprising outputting the converted document through an interface of a web browser,
wherein the outputting of the converted document includes outputting the converted document with a plurality of pages visually existing in the converted document, spaced apart from each other.

25. A server, comprising:
a communication module to communicate with an external electronic device; and
a controller configured to:
receive, from an external electronic device, a document file with respect to an original document generated through a word processing program on a local device, the generated original document having a plurality of pages, wherein each of the plurality of the pages included in the original document has an identical page layout,
load the document file to a memory,
extract content information about original content of the original document and layout information including the page layout of the original document from the document file,
wherein the layout information includes a data which is related to a page size and a page blank space of the original document, the page blank space having at least one of a top margin and a bottom margin of the original document,
generate a content layer as a single sheet based on the content information, wherein content of the content layer described in the single sheet corresponds to the original content of the original document described in the plurality of the pages,
change the content layer based on the layout information, the changed content layer having an intermediate blank space which is inserted into a separating position of the content of the content layer, the separating position corresponding to a page boundary of the original document which is determined by the page layout of the original document, wherein a size of the intermediate blank space is determined based on at least one of the top margin and the bottom margin,
generate a frame layer including a plurality of page frame images based on the layout information, wherein a number of the plurality of the page frame images is identical to a number of the plurality of the pages of the original document, the plurality of the page frame images have an identical size, and each of the plurality of the page frame images has a page frame boundary,
wherein each of the page frame images has a page frame boundary separating an internal region and an external region of the frame layer,
and generate a converted document by combining the content layer and the frame layer, wherein the content layer is provided as the single sheet and the frame layer is overlaid on the single sheet so that the converted document being provided as the single sheet electronically is visually represented as having the plurality of the pages.

* * * * *